Figure 1:
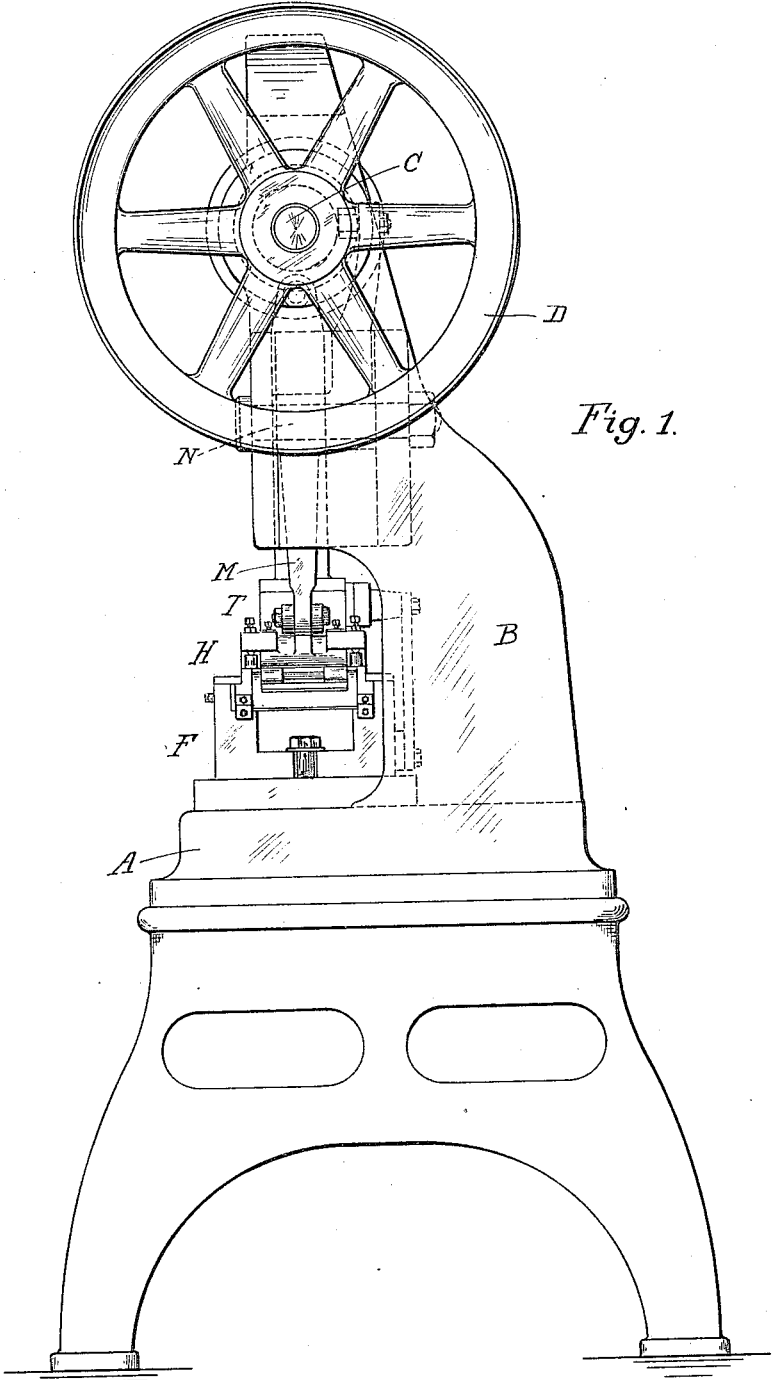

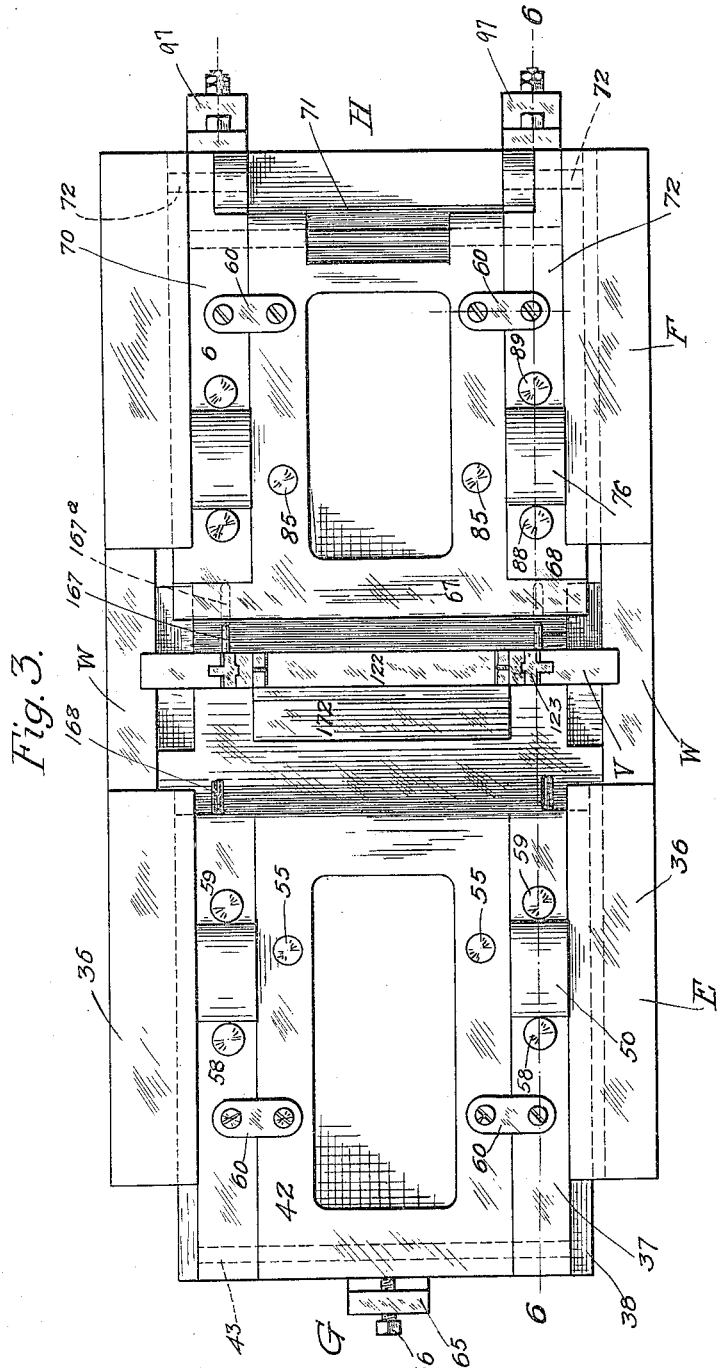

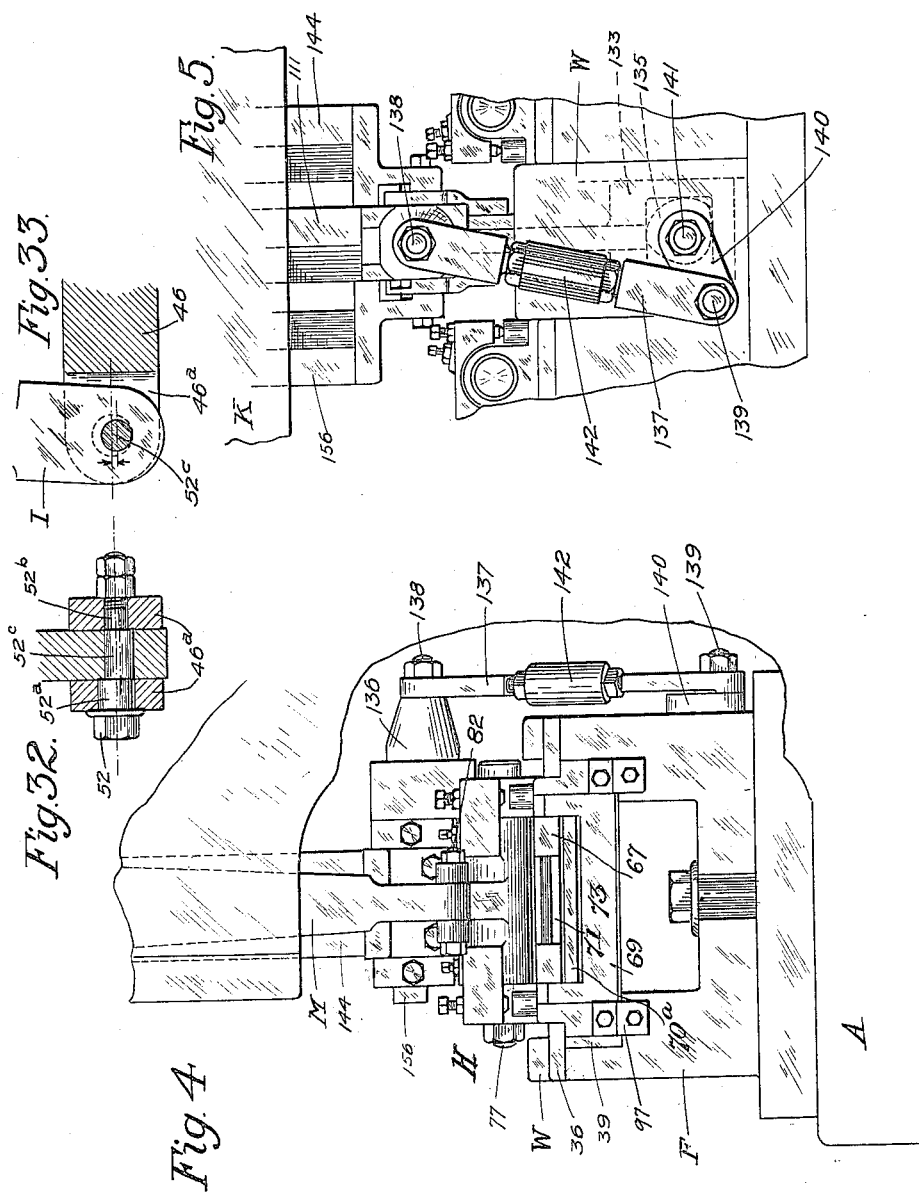

L. T. BULLEY & G. E. WHEELER.
PLAITING MACHINE.
APPLICATION FILED DEC. 16, 1912.

1,139,454.

Patented May 11, 1915.
12 SHEETS—SHEET 5.

WITNESSES:
INVENTORS:
ATTORNEYS.

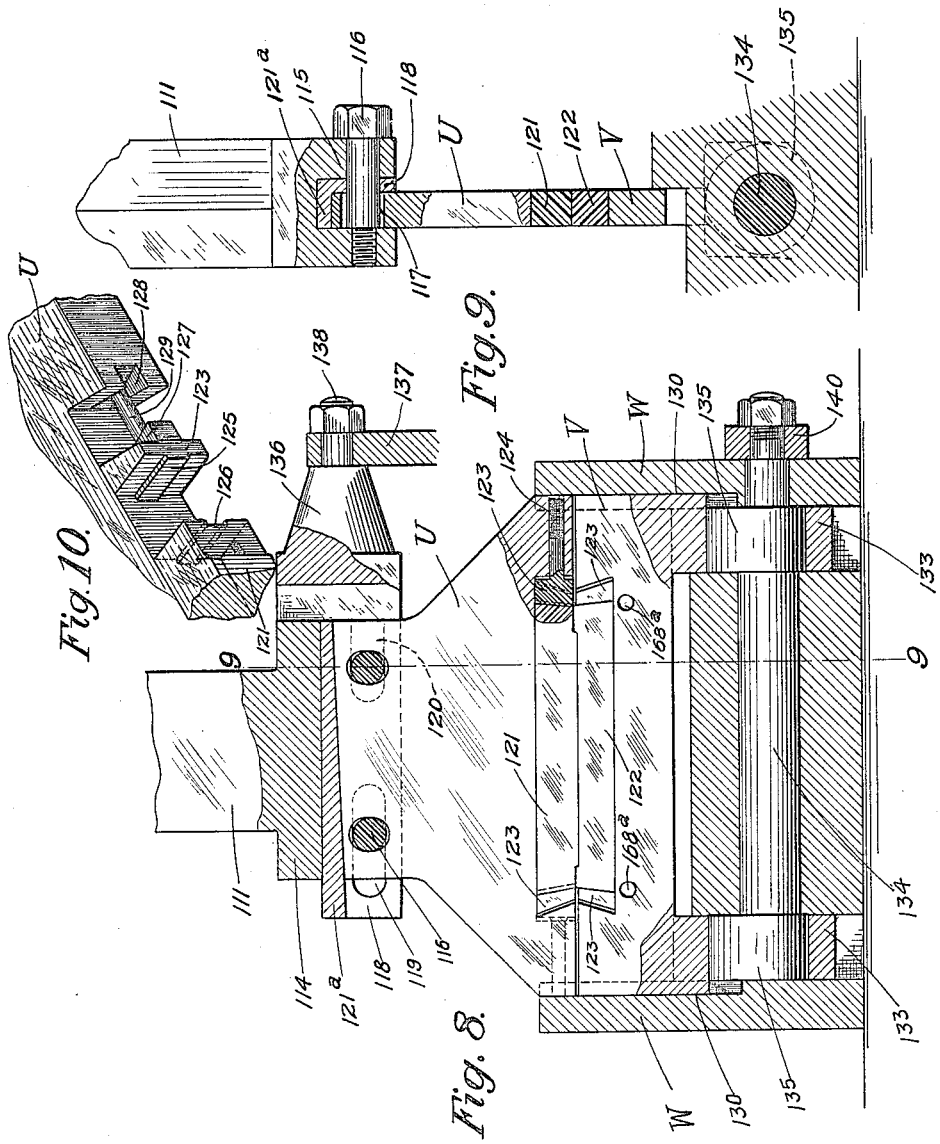

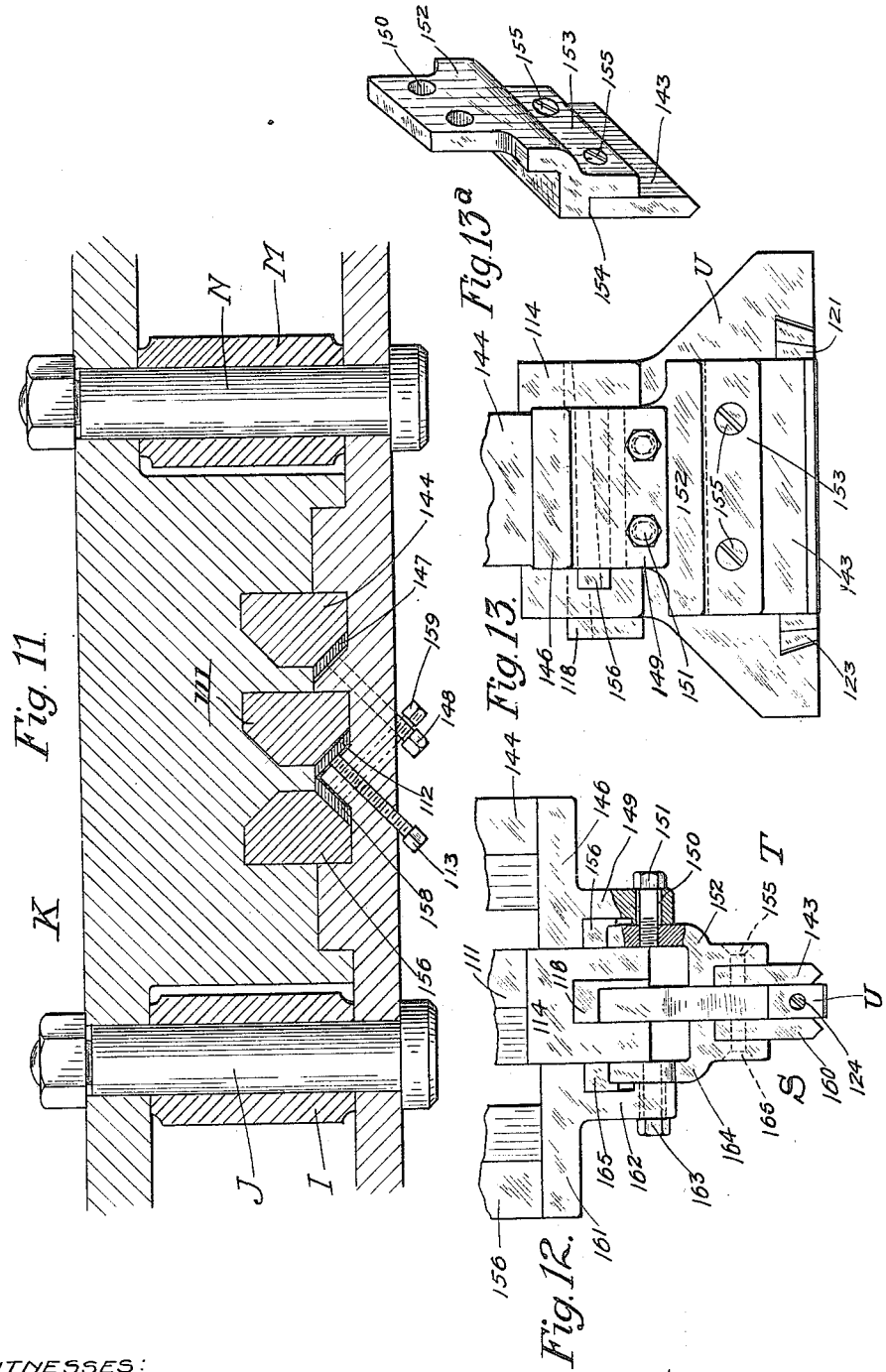

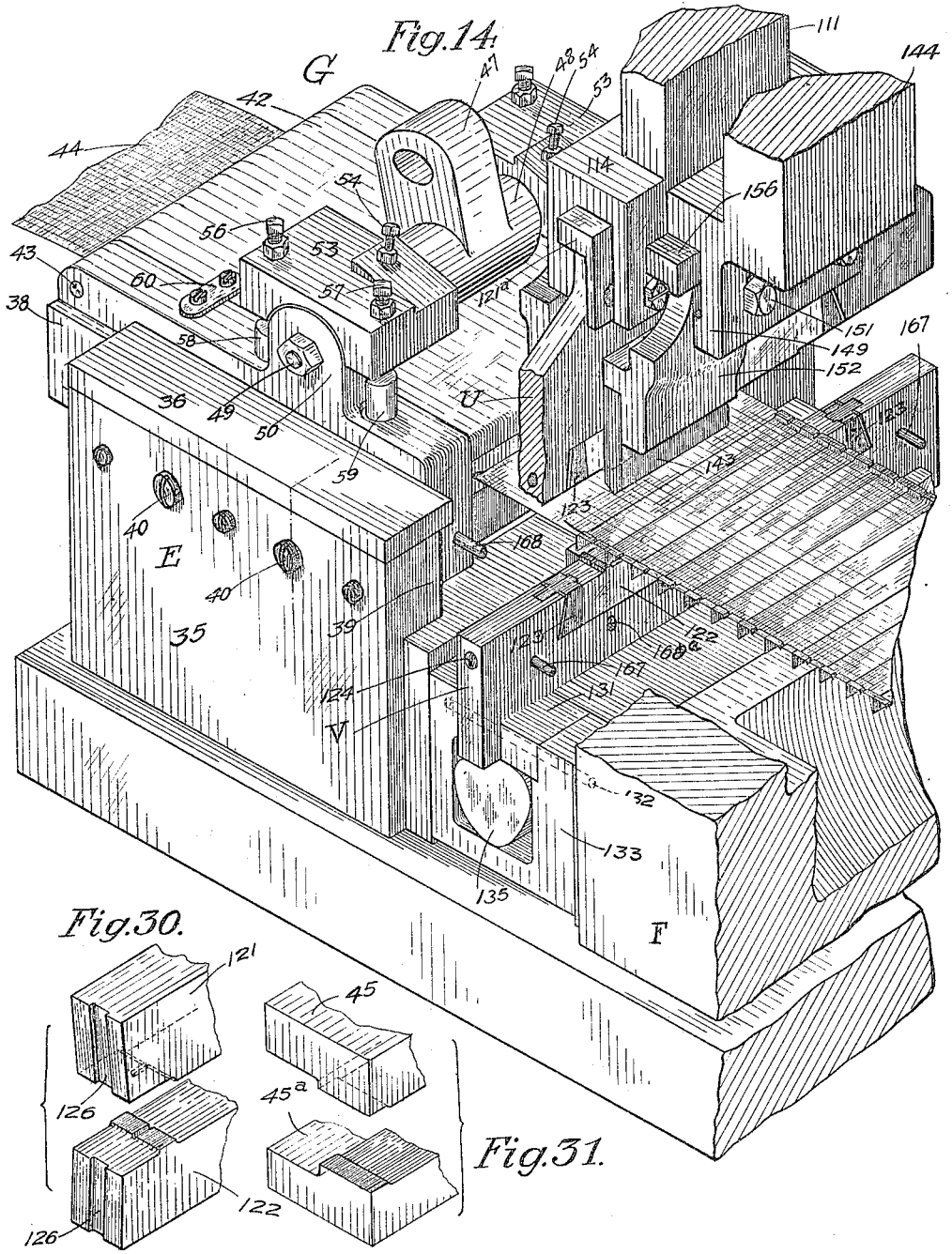

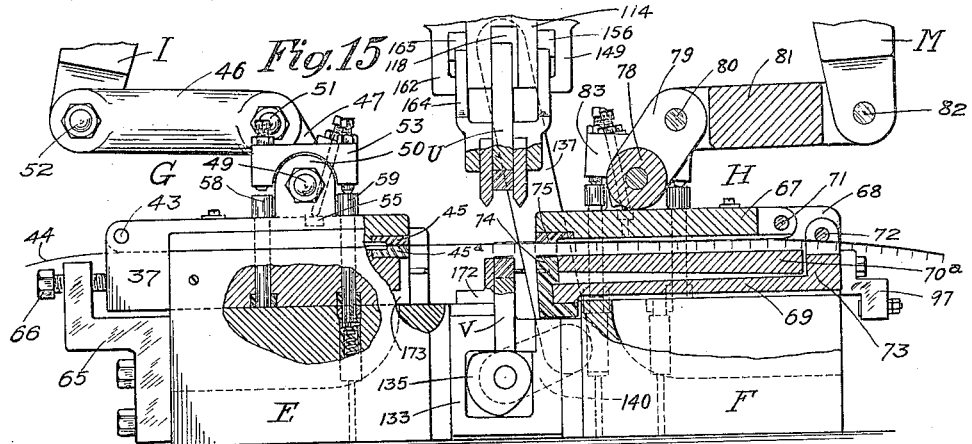
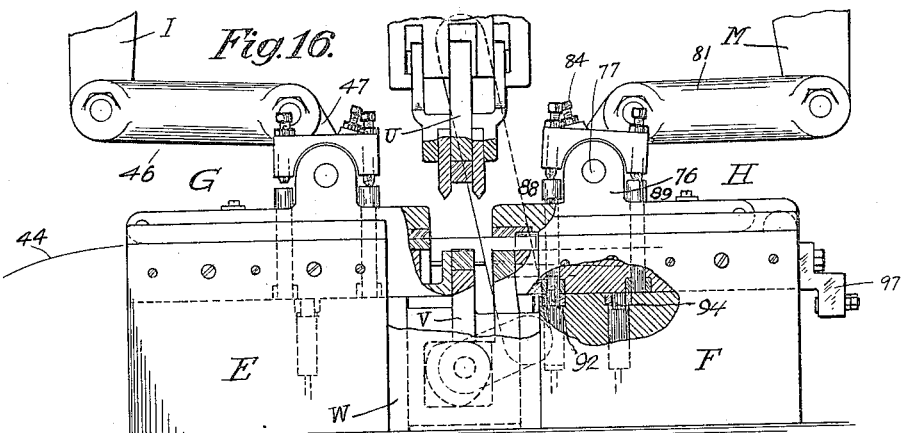
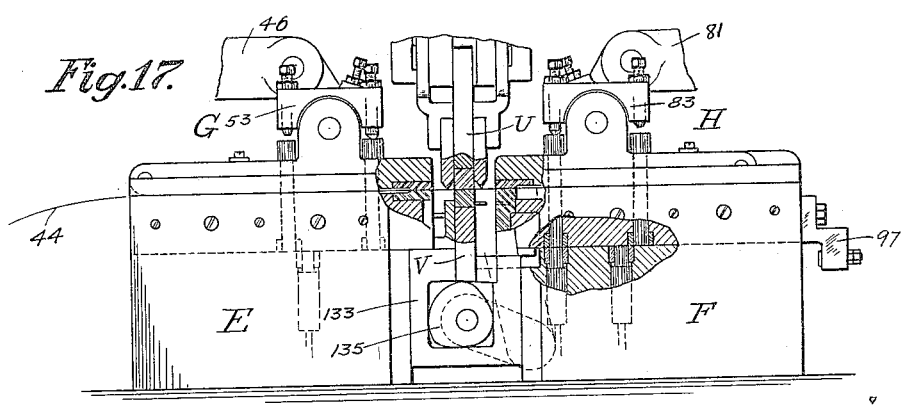

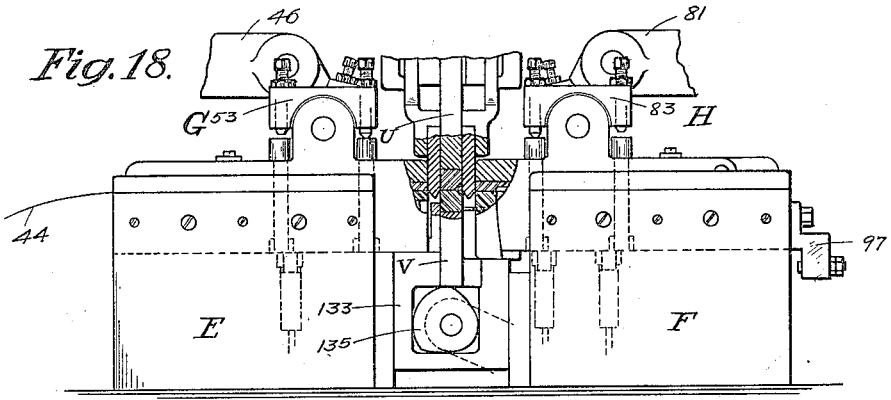
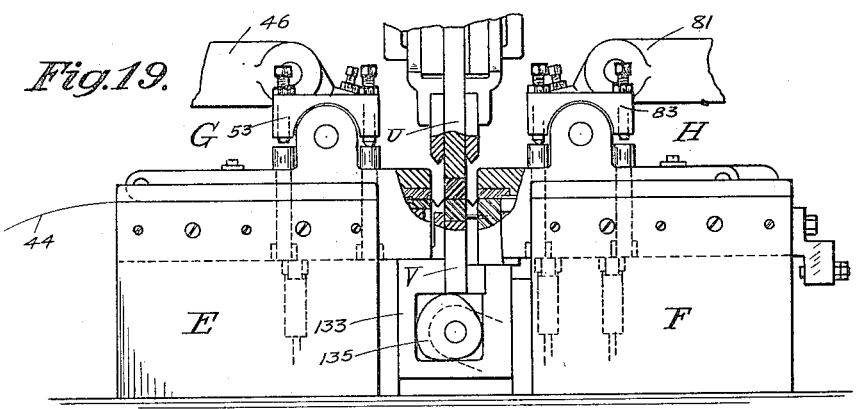
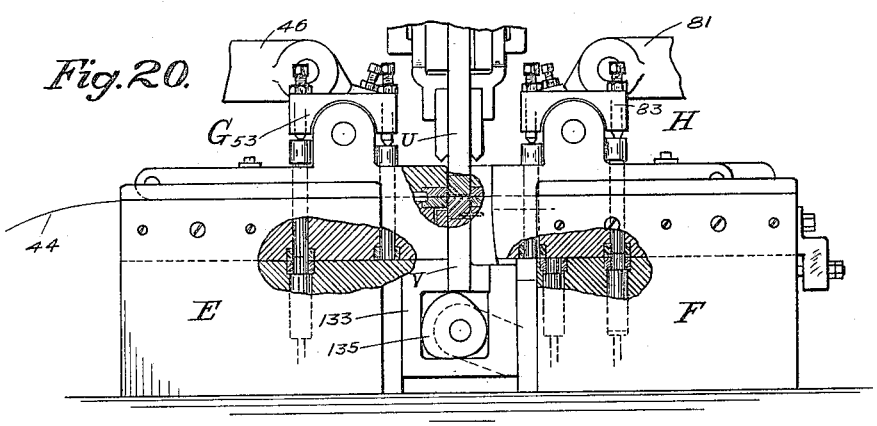

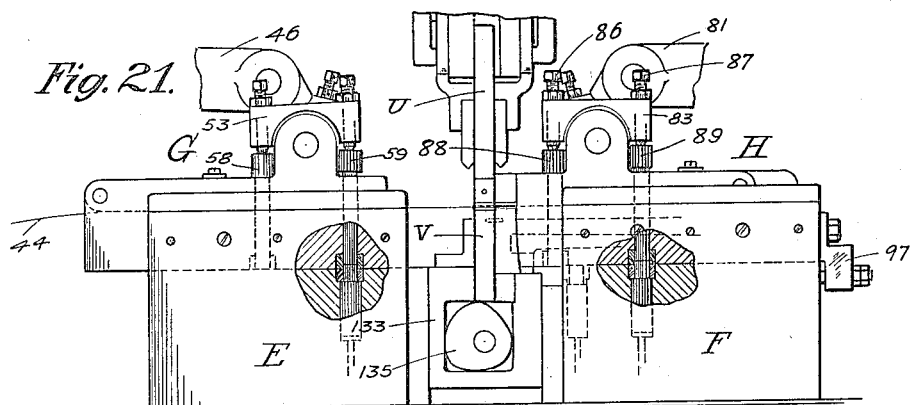
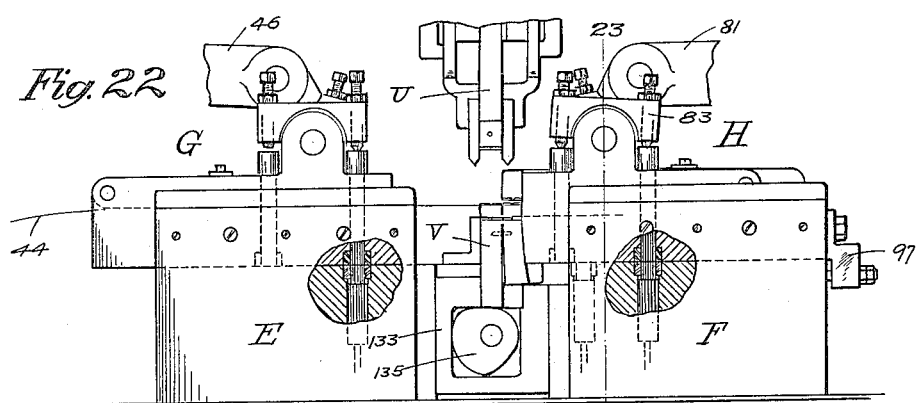
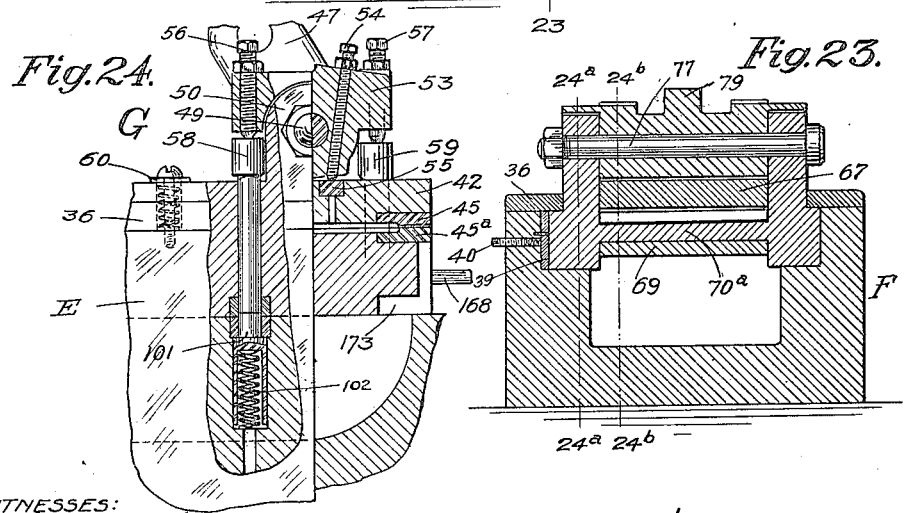

L. T. BULLEY & G. E. WHEELER.
PLAITING MACHINE.
APPLICATION FILED DEC. 16, 1912.
1,139,454.
Patented May 11, 1915.
12 SHEETS—SHEET 12.
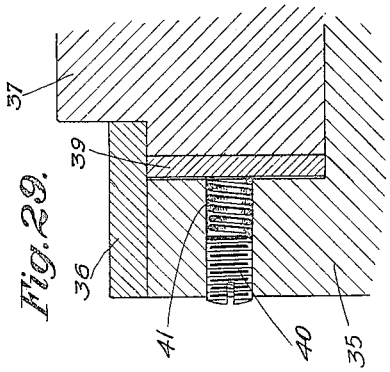
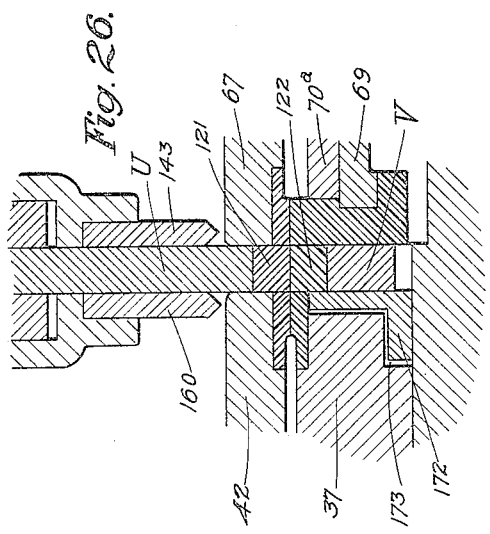
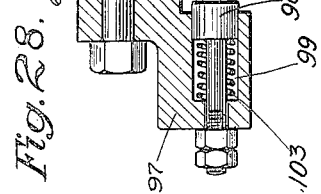
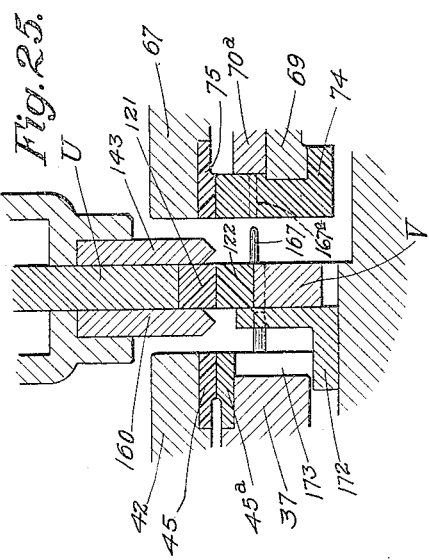
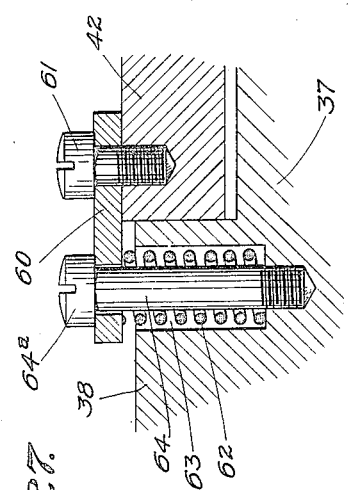
WITNESSES:
INVENTORS:
BY
ATTORNEYS.

UNITED STATES PATENT OFFICE.

LOUIS T. BULLEY AND GARDNER E. WHEELER, OF NEW HAVEN, CONNECTICUT.

PLAITING-MACHINE.

1,139,454.         Specification of Letters Patent.     Patented May 11, 1915.

Application filed December 16, 1912. Serial No. 737,132.

*To all whom it may concern:*

Be it known that we, LOUIS T. BULLEY and GARDNER E. WHEELER, both citizens of the United States, residing in New Haven, county of New Haven, and State of Connecticut, have invented certain new and useful Improvements in Plaiting-Machines, of which the following is a full, clear, and exact description.

This invention relates primarily to machines for forming plaits in sheet metal, and it has special reference to machines for forming a plurality of equally spaced transverse plaits in long strips of brass or like metal which are to be used in the manufacture of radiator sections for automobile radiators. The utility of the machine is not limited, however, to this particular line of manufacture, as the various products which may be made without departing from the general principles of our invention will be found useful in other connections.

Heretofore the plaiting of metal sheets or strips has been effected in some instances by a machine which corrugates the sheet and then closes up the corrugations to form the plaits. When this method is employed it has been found necessary to form each corrugation by a series of successive operations in order to make it sufficiently sharp or acute, and after the corrugation is brought into the desired shape it is necessary to subject the stock to a still further operation, of an altogther different character, for the purpose of closing the side walls of the corrugation to form the plait. Such a procedure therefore necessitates a large number of operations on the metal before the plait is finally formed, and hence the capacity of the machine is quite limited as a result of the comparatively slow bending up of each individual plait. In other instances, a type of machine has been employed in which the plait is formed at a single folding operation by means of oppositely arranged pairs of movable jaws which grip the sheet of stock along laterally spaced lines and are then moved together to bend or fold into a plait that portion of the sheet which extends between them. However, only one plait is formed at a time, and hence in this case also the capacity of the machine is considerably restricted.

Our present invention has among its primary objects the elimination of the drawbacks above recited, and we aim to provide a machine in which a plurality of plaits are completely folded or bent up from the flat stock at a single operation, so that the capacity of the machine is very largely increased as compared to the machines which have been heretofore devised. We also propose to provide mechanism for forming each plait very accurately by a single folding of the stock; to furnish adjusting means by which the dimensions of the product may be varied with great nicety and precision; to provide means of adjustment whereby the depth of two simultaneously formed plaits may be varied within certain limits while maintaining exact equality and uniformity between them; to improve the construction of the bending or folding parts and the mechanism for operating the same; to coördinate a number of plaiting instrumentalities with each other and with feeding mechanism in a simple, compact and superior manner; and to combine maximum simplicity and accessibility of the machine construction as a whole with maximum capacity and efficiency and maximum accuracy and uniformity of the finished product.

To these and other ends, the invention consists in the novel features and combinations of parts to be hereinafter described and claimed.

Figure 2:
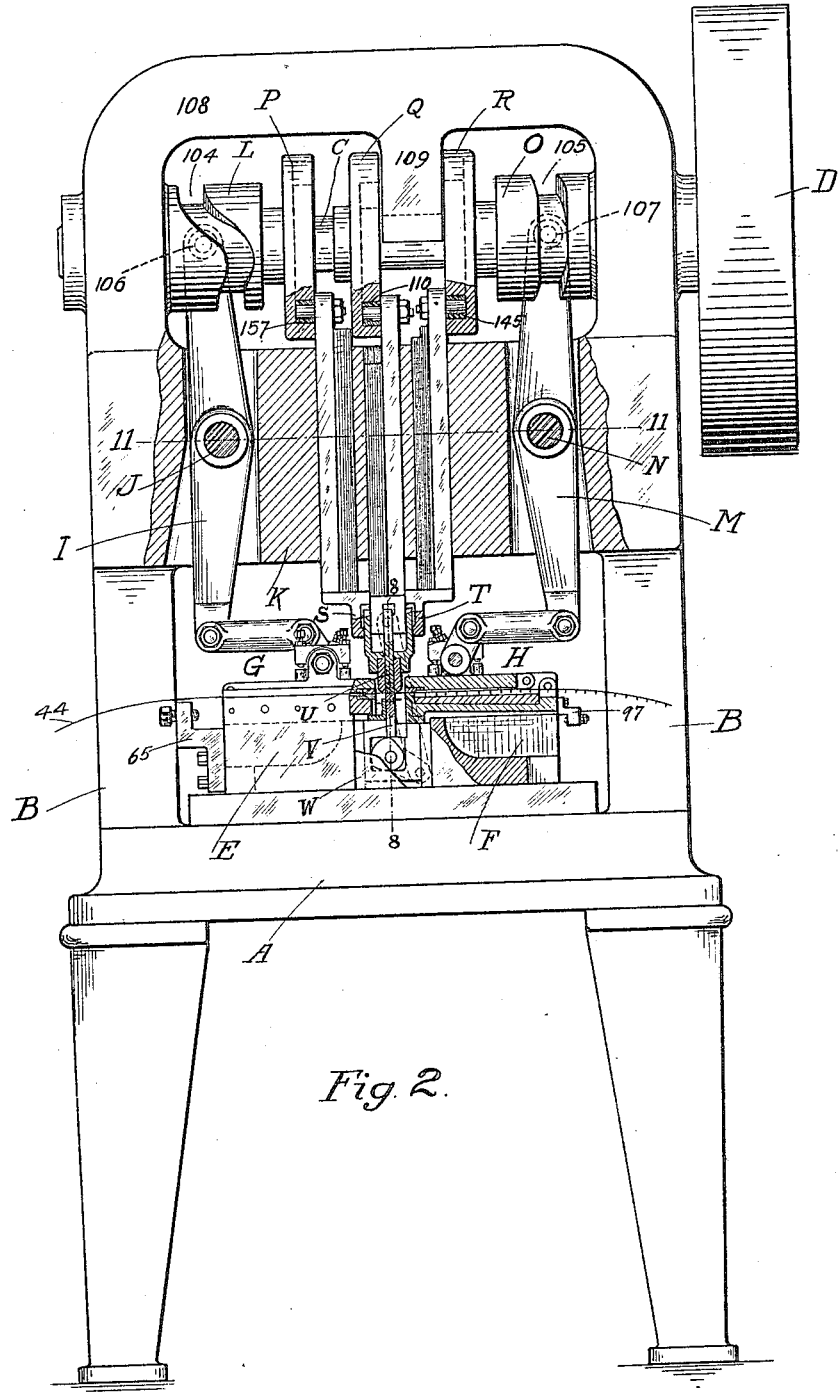
Figure 6:
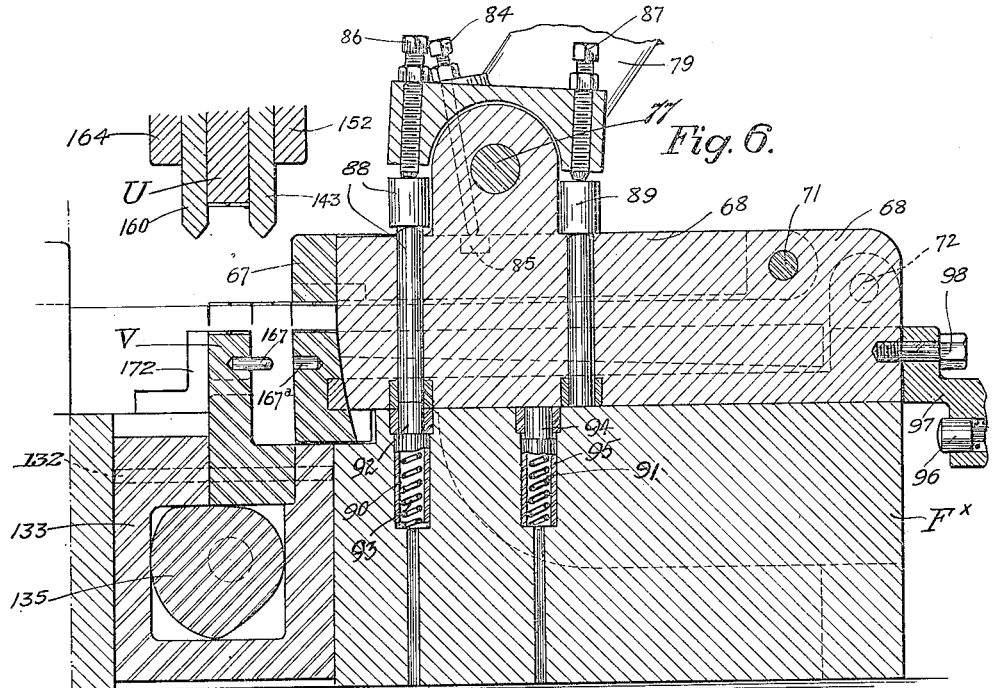
Figure 7:
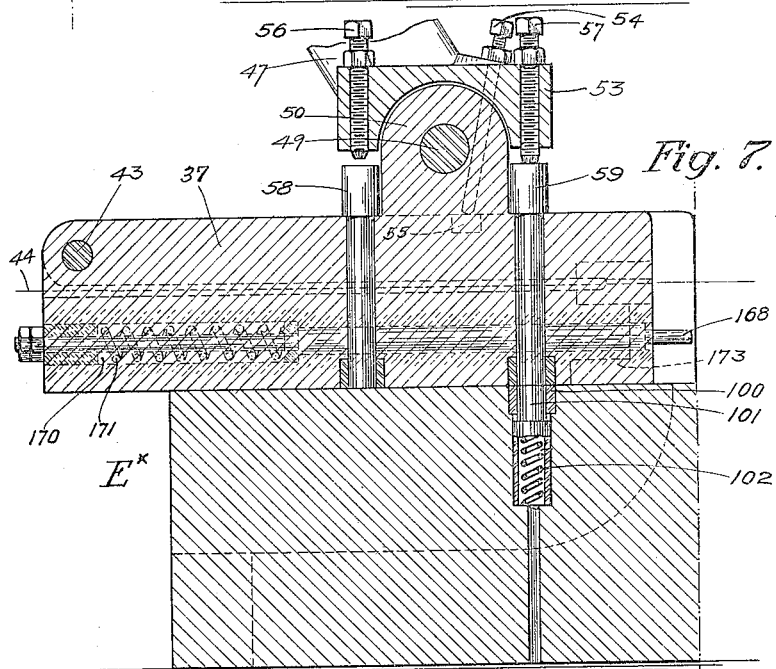

In the accompanying drawings, Figure 1 is an end elevation of a metal plaiting machine embodying our invention, Fig. 2 is a front elevation of the same with certain parts shown in vertical longitudinal section, Fig. 3 is an enlarged top plan view of the machine with the omission of the upper intermediate gripping member and its associated mechanism and of the operating mechanism for the several devices, Fig. 4 is an enlarged end view of a portion of Fig. 1 with the frame of the machine partially broken away, Fig. 5 is a fragmentary rear view of the mechanism shown in Fig. 4, Figs. 6 and 7 show, in conjunction, an enlarged vertical longitudinal section of the plaiting mechanism, Fig. 8 is an enlarged vertical transverse section of the plaiting mechanism on line 8—8 of Fig. 2, Fig. 9 is a fragmentary section on line 9—9 of Fig. 8, Fig. 10 is an enlarged detail perspective view of the die clamping mechanism shown in Fig. 8, Fig. 11 is an enlarged section on line 11—11 of Fig. 2, Fig. 12 is a detail front elevation, partly in section, of the upper intermediate gripping member and its associated stock guiding elements, Fig. 13 is a side elevation of the parts shown in Fig. 12, Fig. 13ª is a detail perspective view of one of the stock guiding elements, which force the stock into the spaces between the movable gripping devices and the lower intermediate gripping member or anvil, Fig. 14 is an enlarged perspective view of the left hand portion of the machine as shown in Fig. 2, with a number of parts broken away, illustrating the feeding of the stock through the machine, Figs. 15 to 22 inclusive are front elevations of the plaiting mechanism, with some parts in section and other parts omitted, illustrating the different stages in the operation, Fig. 23 is a section on line 23—23 of Fig. 22, Fig. 24 is a detail section partly on line 24ª—24ª and partly on line 24ᵇ—24ᵇ of Fig. 23, Fig. 25 is an enlarged detail section of a portion of the plaiting mechanism in the position shown in Fig. 17, Fig. 26 is a similar view showing the parts in the position illustrated in Fig. 20, Fig. 27 is an enlarged detail section of the means for holding the upper jaws of the movable gripping devices normally in their elevated positions, Fig. 28 is a sectional detail of the means for starting the return movement of the right hand movable gripping device (Fig. 20) after the completion of the plaiting operation, Fig. 29 is a sectional detail of the means for frictionally controlling the sliding movement of the movable gripping devices, Fig. 30 is a fragmentary perspective view of the dies carried by the upper and lower intermediate grippers, Fig. 31 is a similar view of the end portions of the hardened inserts carried by one of the movable gripping devices, Fig. 32 is a detail transverse section of the adjustable connection between one of the main lever arms and the link to actuate one of the movable gripping devices, and Fig. 33 is a detail longitudinal section of the parts shown in Fig. 32.

Referring to the drawings, our improved machine comprises in its general features a suitably supported base or bed plate A having standards B in which a main driving shaft C is journaled. The driving shaft C is driven by a suitable source of power, for instance, by means of an electric motor (not shown) connected by a belt (not shown) with a belt pulley D on one end of the shaft C. On the bed or base A, rectilinear guides E, F are arranged in line with each other longitudinally of the machine, and mounted in the respective guides are movable gripping devices G, H respectively, arranged to move toward and away from each other. The device G is operated by means including a lever I pivoted at J in a cross piece or bridge K connecting the standards B, and oscillated by means of a cam L on one end of the shaft C. The device H is actuated in a generally similar manner by means including a lever M pivoted in the bridge or cross piece K at N, and oscillated by means of a cam O at that end of the shaft C opposite the cam L. Between the cams L and O three cams P, Q, R are fixed to the shaft C. The cams P and R actuate reciprocating stock guiding devices S, T respectively, while the cam Q opens and closes a gripping device U, V fixed lengthwise of the machine between the movable gripping devices G, H.

Referring now to the detailed construction of the machine, it will be noted that the gripping device G in the guide E is composed of jaws 37 and 42. The guide E is constituted by upright side members 35 (Fig. 14) having overhanging longitudinal strips 36 at their upper ends which retain in place the lower jaw 37, which is formed as a sliding block set in between the side members or guide walls 35 and having shouldered upright side walls 38 engaged with the strips 36 to prevent vertical or transverse movement of the jaw relatively to its guideway, though permitting a longitudinal sliding movement. Between that wall 35 of the guideway which is at the front of the machine, and the adjacent side face of the lower jaw 37, a gib 39 is interposed, and said gib 39 is adjustable toward and away from the jaw by means of screw plugs 40 in said wall 35. Between the plug 40 and the gib 39 a spring 41 is interposed, as shown in Fig. 29, so as to force the gib against the member 37. As the plugs 40 are adjusted in and out, the effect of the springs 41 will be varied in an obvious manner and the frictional contact between the gib and the jaw member may be regulated as desired, in order to control the facility with which the jaw member may slide in its guideway.

The upper jaw 42 is pivoted to the lower jaw 37 by means of a pintle 43 extending between the side walls 38 at the left end of the lower jaw. This jaw 42 consists of a flat plate fitting between the side walls 38 of the lower jaw and having its upper surface about flush with the top surfaces of said side walls when the parts are in normal position. The under surface of the jaw 42 is opposed to the upper surface of the bed of the jaw 37, and at the point of pivoting the jaws together by means of the pintle 43 sufficient clearance is left between the jaws to permit the insertion of the sheet of metal 44 which is to be operated upon. At the opposite or free ends of the jaws 37, 42 the latter are provided with metal gripping surfaces afforded by inserts 45, 45ª of hard metal. These hard metal inserts carried by the free ends of the respective jaws, have comparatively wide, flat surfaces between which the metal strip 44 is tightly gripped as the jaws are closed.

The gripping device G is actuated from the lever I by means of a connecting link 46 pivoted to a crank 47 on a transverse sleeve 48 carried by the lower jaw 37. This sleeve is mounted for oscillation on a bolt 49 connecting lugs or bearings 50 projecting upward from the respective side walls 38 of the lower jaw. The link 46 is pivoted to the crank 47 by means of a nutted bolt 51, and the link is pivoted to the lever I by means of a nutted bolt 52. Referring particularly to Figs. 32 and 33, it will be noted that the link 46 is provided with a forked extremity 46$^a$ within which the extremity of the lever I is fitted. The end portions 52$^a$, 52$^b$ of the bolt 52 fit openings in the branches or tines of the fork, while the intermediate portion 52$^c$ of the bolt fits a correspondingly shaped opening in the lever I. The portion 52$^c$ is formed as an eccentric, so that as the bolt is turned to a certain extent on its axis in the forked portion of the link, the lever and link will be moved laterally with respect to each other in one or the other direction. The sleeve 48 is provided at its respective ends with integral blocks 53 overlying the respective bearings 50 and provided with concave under surfaces coöperating with convex surfaces on the upper ends of the lugs or bearings 50, whereby the blocks 53 are firmly supported for oscillation about the axis of the sleeve or crank shaft 48. The blocks 53 are provided with adjustable clamping screws 54, the lower ends of which protrude through the blocks and are adapted to contact with hard metal inserts 55 on the upper surface of the jaw 42 (Figs. 3 and 15). The screws 54 are inclined somewhat with respect to the vertical so that their lower ends are approximately in the longitudinal center line of the blocks 53 and shaft 48. In addition to the screws 54, the blocks 53 are each provided at opposite sides of the crank shaft axis with screws 56 and 57 respectively, which are arranged vertically and whose lower projecting ends are adapted to contact with sliding pins 58, 59 respectively, movable vertically in the side walls 38 of the lower jaw 37. The upper ends of the sliding pins 58, 59 project slightly above the top surfaces of the walls 38 and are enlarged to present substantial bearing surfaces for the respective coöperating screws. The pins 58 and 59 may, if desired, coöperate with sockets 100 formed in the bed E$^x$ of the guideway E at opposite sides, each socket 100 having a pin 101 therein urged in an upward direction by a coiled spring 102, for the purpose to be hereinafter described.

In order to hold the gripping surface of the upper jaw 42 normally separated from the coöperating surface of the lower jaw to an extent sufficient to permit the sheet 44 to be moved freely relatively to the jaws, and vice versa, the following mechanism is provided: Attached at opposite sides to the upper surface of the jaw 42 are small plates 60, one of which is shown in detail in Fig. 27. Each plate is secured rigidly to the upper jaw by means of a screw 61, and it overhangs to a certain extent the corresponding upright side wall 38 of the lower jaw. Within the wall 38 a coiled spring 62 is housed in a suitable socket 63, bearing at one end against the bottom of the socket and at the opposite end against the under surface of the plate 60. The tendency of the spring 62 is to raise the plate 60 of the jaw 42 to such an extent that the clamping surface of said jaw 42 will be considerably separated from the coöperating surface of the lower jaw, but the action of the spring in this respect is limited and controlled by means of a screw 64 which passes loosely through an opening in the plate 60 and is screwed into the bottom of the socket. The head 64$^a$ of said screw is larger than the opening in the plate 60 so that said head acts as a stop for the plate to limit the upward movement thereof and of the upper jaw. Manifestly the adjustment of the screw 64 by screwing it into or out of its socket will vary correspondingly the distance at which the upper jaw will be normally separated from the lower jaw by means of the spring 62. It will be understood, of course, that the arrangement of the plates and springs is the same at both sides of the jaw 42 so that the spring action on the jaw will be uniformly distributed.

In order to arrest the device G at the desired point in its travel away from the gripping device U, V, we provide adjustable stop means in association with the guideway E. This stop means may comprise a bracket 65 bolted or screwed to the left hand end of the guideway (Figs. 2 and 15) and carrying an adjustable stop screw 66 against which the adjacent end of the lower jaw 37 is adapted to abut. As this screw 66 is screwed through its threaded opening in the bracket 65 the retreating movement of the device G relatively to the device U, V will be correspondingly shortened, whereas an opposite adjustment of the screw 66 will permit a lengthening of the sliding movement of the device G. The top of the bracket 65 should obviously be located below the clearance space between the jaws 37, 42 so that it will not obstruct the entering sheet of stock.

The guideway F is substantially similar to the guideway E previously described. The upper jaw 67 of the device H is also generally similar to the upper jaw 42. However, instead of being pivoted directly to the lower jaw it is pivoted to a guide block 68 slidable lengthwise in the guideway F and fitted therein in substantially the same manner as the lower jaw 37 is fitted in the guideway E. The lower jaw 69 of the device H is in turn pivoted independently to the block 68 and has a swinging movement relatively to said block toward and away from the upper jaw 67. The main portions of the upper and lower jaws 67, 69 are separated by a web 70ª extending horizontally between and connected with the upright side walls 70 of the block 68, the jaw 67 being above the web and the jaw 69 lying for the most part beneath the latter. The upper jaw 67 is pivoted to the block 68 by a pintle 71 connecting the side walls 70 of the block in substantially the same manner as the pintle 43 previously described connects the side walls of the jaw 37. The lower jaw 69 is pivoted to the block 68 by means of pins 72 located adjacent the pintle 71. The web 70ª does not extend completely to either end of the block 68 and thereby clears a depending portion 73 by means of which the jaw 69 is pivoted to the pins 72, and said web also clears at its opposite end a gripping block 74 of hard metal carried by the free end of the lower jaw and extending upward alongside the adjacent end of the web to coöperate with a gripping block or insert 75 of hard metal carried by the free end of the upper jaw 67. The jaws 67, 69 and the web 70 are so arranged that the block or inserts 74, 75 may be tightly clamped on a flat portion of the metal sheet while providing sufficient clearance between the main portion of the upper jaw and the web to prevent the deformation of the plaited portion of the sheet between the web 70 and the body portion of the jaw 67, as hereinafter described. The upper jaw 67 is normally held at the desired elevation by means of spring pressed plates 60 and stops 64 similar to those previously described. The facility with which the block 68 may slide in the guideway 58 is controlled by means of a spring pressed gib 39 similar to that previously described in connection with the jaw 37 and adjustable by similar screw plugs 40.

The block or carrying member 68 on which the jaws 67, 69 are independently mounted is connected with the corresponding operating lever M by connections similar to those between the lever I and the jaw 37. Extending upward from the side walls 70 of said block or carrying member are lugs or ears 76 similar to the lugs or ears 50, and serving to support a cross rod or bolt 77 on which a sleeve or shaft 78 similar to the sleeve or shaft 48 is mounted for oscillation. On the sleeve or shaft 78 is a crank 79 pivotally connected by means of a nutted bolt 80 with one end of a link 81. The opposite end of the link 81 is connected with the lower end of the lever M by means of a special form of nutted bolt 82 similar to the bolt 52, so that the lever and link may be adjusted laterally with respect to each other in the manner previously described. The sleeve or shaft 78 is provided at its ends with blocks 83 similar to the blocks 53 and mounted to oscillate on the lugs or ears 76. Each block 83 carries screws 84 similar to the screws 54 previously described and adapted to coöperate with hardened inserts or plugs 85 set in the upper face of the jaw 67 and similar to the plugs or inserts 55. Each block 83 is moreover provided with screws 86 and 87 similar to the screws 56 and 57 and adapted to coöperate with sliding pins 88 and 89, similar to the pins 58 and 59 and vertically guided in the upright side walls of the block or carrying member 68. The pins 88 and 89 pass downward completely through the side walls of the block or carrying member and may, if desired, coöperate with pairs of sockets 90, 91 similar to the single pair of sockets 100. The sockets 90 serve as guides for vertically directed pins 92 urged in upward direction by springs 93, and the sockets 91 serve to guide pins 94 urged in upward direction by springs 95. The sockets 90 and 91 are formed in the bed F$^x$ of the guideway F at different points in the length of said guideway and the particular function of said sockets and of the spring pressed pins guided therein will be pointed out hereinafter.

The carrying member 68 and jaws 67 and 69 of the device G are normally held away from the gripping device U, V by means such as spring pressed pins 96 mounted in brackets 97 secured at opposite sides of the right hand end (Fig. 3) of the carrying member or block 68. Each bracket 97 may be secured to the carrying member or block by means of a screw 98 and each pin 96 is projected normally out of a socket 99 in the bracket by means of a spring 103. As the block or carrying member is moved toward the device U, V the head of each pin 96 will contact with the end portion of the guideway F, thereby compressing the spring 103, so that as soon as the block is free to move away from the device U, V it will spring back from the same for the purpose hereinafter explained.

The cams L, O for actuating the respective movable gripping devices G, H are shown as of generally cylindrical form, having on their peripheries cam groves 104 and 105 respectively. The groove 104 of cam L is engaged in the well known manner by an anti-friction roller 106 on the upper extremity of the lever I, and the groove 105 of cam O is similarly engaged by an anti-friction roller 107 on the lever M. The rollers 106, 107 are engaged with the respective cams at the rear of the latter, as shown by the dotted lines in Figs. 1 and 2, and hence as the levers I, M are pivoted on the pins J, N in the vertical plane of the main driving shaft C it is necessary to offset the upper end portions or branches of the respective levers, as shown, in order to carry them up substantially to the horizontal plane of the main driving shaft. As the driving shaft is rotated, the cams L, O will oscillate the levers I, M respectively in a direction lengthwise of the machine and the movable gripping devices G, H will be reciprocated in the guideways E, F respectively toward and away from the fixed intermediate gripping device U, V. In order to prevent any upward springing of the main shaft C, we prefer to connect the standards at the top by means of a yoke 108 carrying an intermediate pillow block or abutment 109 forming a bearing for the shaft at the upper part of its intermediate portion.

Turning now to the particular construction and arrangement of the intermediate gripping device, it has been previously stated that the members U, V are actuated by means of the cam Q. This latter cam is illustrated as of the disk type, having a face groove engaged by an anti-friction roller 110 at the upper end of a sliding bar 111. The bar 111 is preferably of angular cross-section, as shown in Fig. 11, and it is rectilinearly guided in a vertical direction in the cross piece or bridge K of the main frame. A gib or key 112 is placed in the guideway of the bridge K in which the bar 111 is guided, and said gib or key may be adjusted toward and away from said bar by means of an adjusting screw 113. The gib is forced snugly against the bar by the adjusting screw in order that the bar may be prevented from lateral play in its guide. The gib will naturally be formed of Babbitt or other anti-friction metal. The lower end of the sliding bar 111 is provided with a cross head 114 disposed transversely of the machine and adapted for connection with the upper intermediate gripping member U. The member U is preferably formed as a flat plate narrower at the top than at the bottom. The connection between the plate and cross head is preferably an adjustable one to permit the adjustment of the plate in a vertical direction with respect to the bar, and in the embodiment illustrated, we have shown the cross head 114 provided with a fork 115 in which the upper end of the plate is adjustably fitted. Bolts 116 connect the branches of the fork 115 and pass through openings 117 in the upper end of the plate U, which openings are of elongated form to permit the plate to be adjusted vertically to a certain extent. A key 118 is fitted between one side face of the plate U and the opposing branch of the fork 115 and is provided with a clearance slot 119 to clear one of the bolts 116 and with a clearance notch 120 to clear the other bolt. The key 118 is provided with a wedge shaped portion 121ª overlying the top surface of the plate U, which is inclined from front to rear to coöperate with the incline of the wedge. Hence as the key 118 is pushed farther into the fork 115 the gripping plate U will be moved downward with reference to its supporting bar. When the plate has been placed in the desired position lengthwise of its supporting bar, by manipulation of the wedge shaped key, the bolts 116 are tightened in order to lock the parts tightly in the adjusted position.

The plate U is provided at its lower edge portion with a hardened block or insert 121, the lower surface of which may be shaped to give a portion of the strip of metal 44 any special form which may be desired. The part 121 coöperates with a similar part 122 carried by the lower gripping member V, and in the embodiment illustrated the blocks 121, 122 are shaped as dies to offset the edges of the sheet of stock as the latter is pinched or pressed between the gripping members U, V. Each block or die is removably clamped in place at both ends by means of gibs or keys 123 (Fig. 10) slidably adjustable by means of screw plugs 124 at the ends of the plates U, V. As each screw plug 124 is rotated to advance the gib 123 toward its corresponding block or die, a lug 125 on the gib will be forced into a notch 126 in the end of the corresponding block or die. In this manner each block or die may be removably clamped in place between the gibs at the ends thereof, and by the relative adjustment of the gibs the die may be shifted longitudinally to a certain extent and horizontally of its associated gripping member. Each gib is prevented from lateral dislocation by means of a shoulder 127 operating in a notch 128 in the corresponding gripping member or plate, and the opposing faces of two coöperating gibs, i. e. the faces which carry the lugs 125, are inclined with respect to each other to form a dovetailed seat for the corresponding die so that it will be held snugly in its socket in the corresponding gripping plate. The adjusting screw or plug 124 for each gib adjusts the latter by engagement with a shank 129 on the gib extending into the bore into which the screw or plug is fitted.

In Fig. 10 we have shown the gripping plate, gib and die block separated from each other to illustrate the construction more clearly but it will be understood, of course, that in the assembled position the shoulder 127 of the gib is always engaged with the notch 128 in the gripping plate while the lug 125 of the gib is always engaged with the notch 126 in the end of the die block.

In case the sheet of stock is to be offset at its side edges between the plaits which are to be formed, the gripping surfaces of the hardened inserts 45 and 45ª of the left hand movable gripping device G will be shaped to correspond generally with the gripping surfaces of the dies or blocks 121, 122, as shown in Fig. 31, and the coöperating surfaces of the inserts 74, 75 of the movable gripping device H will be similarly formed in an obvious manner.

The lower gripper V is constituted by a flat plate of the same thickness as the plate U and is guided vertically directly beneath the latter. The vertical guiding of both plates U, V is effected by means of cheeks W secured in place between the guideways E, F at the front and rear of the machine and having on their inner opposing surfaces guide grooves 130 in which the end edges of the plates U, V are snugly fitted. The lower plate V is guided in the grooves 130 throughout its height, but the upper plate U is only guided in said grooves for a comparatively short distance as the die 121 thereof is brought into close proximity to the die 122 of the plate V. In this manner it is possible to prevent lateral or longitudinal displacement of the dies relatively to each other as they are brought together. As previously stated the relative position of the dies may be varied by the adjustment of the gibs 123 and when this adjustment has been effected the guide cheeks W will always cause the dies to meet each other in exactly the same relation, to insure accuracy of the work.

At its end portions the lower gripping plate V is provided with lateral projections or flanges 131 by means of which it is pinned (by pins 132) to vertically sliding rectangular frames or yokes 133 arranged at the front and rear respectively of the machine and guided vertically by means of the adjacent portions of the guide-ways E, F, immediately back of the cheeks W. In Fig. 14, the cheeks W have been omitted in order to show the mounting of one of the sliding yokes 133 and its connection with the lower gripping plate V. Journaled transversely in the bed or base of the machine beneath the plate V is a shaft 134 (Figs. 8 and 9) having similar cams 135 to engage the respective yokes and the lower end portions of the plate V. Hence as the cams are oscillated, the yokes 133 and plate V will be raised and lowered. It will be noted that the yokes 133 are so located as to underlie and support the free end portion of the lower jaw 69 of the gripping device H, as shown in Fig. 15, and it will be understood that said jaw is raised and lowered by the vertical movement of the yokes 133 as the cams 135 are oscillated, all as more particularly described hereinafter. The cam shaft 134 is actuated from the cross head 114 of the sliding bar 111, which cross head has applied to the rear end thereof a boss 136 to which a link 137 is pivoted at one end by means of a pin 138. The opposite end of the link 137 is pivoted by means of a bolt 139 to a lever 140 fixed at 141 to the rear end of the cam shaft 134. This connection between the bar 111 and cam shaft 134 is so arranged, and the cams 135 are so designed and located on said shaft, that as the upper gripping plate U is moved in one direction the plate V and jaw 69 will be moved together in the opposite direction. Hence as the plate U is raised, the members V and 69 will be lowered, and vice versa. In order to vary the distance through which the lower gripping plate and the lower gripping jaw 69 are moved by the cams the link 137 is formed in sections connected by means of a turnbuckle 142 the adjustment of which will lengthen or shorten the link and thereby vary the throw of the cams.

It has been previously stated that the stock guiding devices S, T are actuated by the cams P, R respectively on the main shaft C. The devices S, T are intended to guide the stock into the spaces between the member V and the grippers G, H.

Referring particularly to the device T, it will be noted that it comprises a vertically directed guiding plate 143 reciprocated vertically by a sliding bar 144 similar to the sliding bar 111 previously described. The bar 144 is provided at its upper end with an anti-friction roller 145 engaging a face groove in the cam R, and at its lower end said bar is provided with an integral bracket 146 by which the plate 143 is supported. The bar 144 is guided in the bridge piece K similarly to the bar 111 and its guide in said bridge has associated therewith a gib 147 and adjusting screw 148 similar to the gib 112 and the adjusting screw 113. The bracket 146 is designed to move in close proximity to or contact with one face of the cross head 114 of the bar 111, and said bracket is provided with a depending flange 149 having holes 150 for the reception of bolts 151 which are screwed into an offset connecting plate 152. This latter plate is provided at its lower portion with a flange 153 creating a seat 154 for the guide plate 143, which is screwed to the flange 153 by screws 155 and bears at one side face against the opposing face of the gripping plate U. The guide plate 143 may be adjusted vertically by means similar to those previously described in connection with the plate U. Between the plate 152 and the bracket 146 a wedge shaped key 156 is interposed, and the opening 150 in the flange 149 for the bolts 151 are made sufficiently large to permit the plate 152 to be raised and lowered relatively to the bracket when the bolts are loosened. This raising and lowering of the plate 152 is effected by proper manipulation of the wedge or key 156 and after the desired adjustment has been reached the parts are tightly clamped in the adjusted position by tightening the bolts 151.

The guiding device S is similar to the device T and bears the same relation to the upper gripping plate U though located on the opposite side thereof. The sliding bar 156 of the device S is provided with an antifriction roller 157 engaging the groove in the cam P and said bar 156 is guided in the bridge K by means of a guideway having a gib 158 and adjusting screw 159 similar to those previously described. At its lower end the bar 156 is connected with a guide plate 160 placed oppositely to the guide plate 143 with reference to the upper gripper member U. Connection between the bracket 156 and plate 160 is effected by means of a bracket 161, flange 162, bolts 163, plate 164, key 165, and screws 166, similar to those previously described in connection with the plate 143.

In order to maintain the lower jaw 69 of the gripping device H in exact alinement with the lower gripping member V, the latter is provided with fixed alining pins 167 adapted to enter correspondingly formed holes 167ª in the adjacent face of the block or insert 74 when the jaw 69 is moved into proximity to the member V. In the same manner the lower jaw 37 of the movable gripping device G is provided with alining pins 168 adapted to enter holes 168ª (Fig. 14) in the plate V. The pins 168 may be spring cushioned, as shown in Fig. 7, in which case they will preferably extend the entire length of the jaw 37 through sockets 170 housing springs 171 acting on said pins.

Between the left hand gripping device G and the lower intermediate gripping member V a stripper 172 is interposed. This may comprise an L-shaped plate one flange of which is fixed horizontally to the bed of the guideway E while the other flange rises alongside the plate V. The stripper plate 172 is considerably shorter than the plate V and arranged at the intermediate portion thereof parallel to the die block 122, and the intermediate portion of the free end of the jaw 37 is cut away at 173 (Figs. 25 and 26) to clear the stripper 172 and enable its insert 45ª to move into close proximity to the side face of the die 122 when the plate V is projected above the top of the fixed stripping device.

The operation of our improved machine in manufacturing plaited metal sheets for automobile radiators is substantially as follows: The flat metal strip 44 which is to be plaited is inserted in the space between the pivoted ends of the jaws 37, 42 of the left hand movable gripping device G when said jaws are approximately in the position shown in Fig. 22, that is, when the link 46 is in an intermediate position in which the screws 54 carried by the crank shaft or sleeve 48 are raised out of contact with the hardened inserts or plugs 55 of the upper jaw 42. Under these conditions, the springs 62 acting on the plate 60 will hold the gripping member 45 away from the coöperating gripping member 45ª to such an extent as to permit the sheet of stock to be easily slid forward between the jaws. The intermediate gripping members U, V being separated, as shown in Fig. 15, the forward end of the sheet is pushed forward between them and it will usually be pushed all the way into the bite of the jaws of the right hand gripping device H, although this is not essential. It will be remembered that when the lower intermediate gripping member V is in its lowermost position the jaw 69 will be likewise lowered, as it rests freely on the top surface of the yokes 133 to which the member V is connected. On the other hand, the upper jaw 67 is urged upwardly by means of its spring pressed plates 60, and hence in this position of the parts there is considerably more than the necessary clearance between the jaws 67, 69 to permit the stock to be inserted between the coöperating gripping members 74, 75.

When the parts are in the relative position shown in Fig. 15, but with the sheet 44 not yet plaited, as shown in that figure, the machine may be started by applying power to the main shaft C and the lower end of the lever I will be moved toward the right through the connections described in order to close the device G on the stock and advance it for the feeding movement. Prior to the swinging of the crank 47 by the movement of the link 46 into the position shown in Fig. 15, the pins 59 of the lower jaw 37 will be pushed upward in their sockets by means of the springs of the pins 101 in the base portion E×, which latter pins will then be in alinement with said sockets. When the pins 101 project into the sockets of the pins 59 they lock the whole gripping device G in a definite position lengthwise of the guideway E. The screws 54, 56 and 57 are so adjusted that there is a certain amount of play or lost motion between the crank shaft 48 and the jaws 37, 42 and when the movement of the link 46 toward the right is started the screws 56 will be in contact with the pins 58 while the screws 54 and 57 will be out of contact with the plugs 55 and pins 59 respectively. As the link 46 is moved toward the right the crank shaft 48 will first be swung freely on its axis 49, without moving the jaws 37, 42 in their guide, until the lower ends of the screws 57 meet the pins 59 to push down the pins 101 and thereby release the jaws from the guide. As the screws 57 meet the pins 59 and release the jaws, the movement of the crank shaft on its pivot will be arrested and the continued movement of the link 46, in acting on the now rigid crank shaft, will move the jaws 37, 42 forward in their guide. The screws 54 will be so adjusted that they will meet the plugs 54 and press the upper jaw 42 down on the stock, to clamp it tightly between the hardened blocks 45, 45$^a$ with the required amount of pressure at approximately the same time that the pins 57 meet the pins 59. Hence the blocks 45, 45$^a$ must grip the sheet with the necessary pressure before the jaws begin to advance in the guide, and as the jaws move forward the sheet will be tightly pinched between them, whereby it will be fed forward by the jaws without possibility of the least displacement. The screws 54 are depressed so forcibly against the upper jaw by the described movement of the crank shaft that the screws 57, pins 59 and pins 101 are useful in relieving them from a portion of the considerable strain to which they would be subjected.

Referring to Fig. 16, it will be observed that the jaws of the movable gripping device G carry the whole sheet of stock forward to a certain extent between the separated gripping members U, V, and between the separated jaws 67, 69 of the oppositely placed movable gripping device H. The cams on the main shaft are so timed as to hold the jaws 67, 69, gripping members U, V and guide members 160, 143 away from the sheet during the advance of the gripping device G into the position shown in Fig. 16. When this position has been reached, a dwell of the cam L holds the gripping device G momentarily fixed in the position shown, while the cams O, R, Q and P actuate their connections to close the jaws 67, 69 on the sheet, bring the gripping members U, V together on the sheet to clamp it intermediately of the respective pairs of jaws, and lower the guide members 160, 143 into close proximity to or approximately into contact with the sheet, as shown in Fig. 17. The gripping members U, V are clamped tightly on the opposite faces of the sheet by the downward movement of the sliding bar 111 actuated by the cam Q. The bar 111 is actuated by the cam Q to carry the clamping member U against the upper surface of the stock, and simultaneously the lower gripping member V will be elevated to engage the under surface of the stock and clamp it fast at a point substantially in horizontal alinement with the bite of the jaws 37, 42. This elevating movement of the gripping member V is produced by the lowering of the link 137 on the cross head 114. As the link 137 is depressed its lower end will swing the lever 140 downward and thereby actuate the cam shaft 134 in such a manner that the cams 135 will raise the yokes 133 and the member V to which they are connected.

At the same time that the cams 135 raise the gripping member V they will also raise the lower jaw 69, and simultaneously the upper jaw 67 will be forcibly swung down to clamp the metal tightly between the gripping member 75 on said jaw and the gripping member 74 on the now elevated lower jaw. The clamping of the upper jaw 67 on the metal is effected through the connections with the actuating lever M in substantially the same manner as the jaw 42 is depressed by its connections with the lever I. The lever M is actuated oppositely with respect to the lever I so as to move the link 81 toward the left thereby swinging the crank shaft 78 on its pivot 79 until the screws 84 contact with the inserts or plugs 85 and press the jaw 67 in tight contact with the stock. At the same time that the screws 84 are depressed to clamp the jaw 67 on the stock the screws 86 will be depressed, and they will depress in turn the pins 88. The latter pins will depress the spring pressed pins 92 in the bed F$^x$ of the guideway F, (which pins 92 have previously been urged upward into the lower ends of the sockets of the pins 88 to lock the gripping device H against longitudinal movement in the guideway F), so that the pins 92 will be forced out of the block 68 to release the same. This position of the parts is shown in Fig. 17, wherein the link 81 is shown as having reached a position in which it will clamp the upper jaw on the stock and force the pins 88 into a position wherein their meeting ends are flush with the dividing line between the block 68 and the bed of its guideway.

In case the machine is intended to form identical equally spaced plaits in the metal sheet, the respective gripping devices, G, H, will be equidistantly spaced from the opposing side faces of the gripping members U, V, as shown in Fig. 17, when said gripping members and the device H have been clamped on the sheet preparatory to the actual plaiting operation. At this stage, the guide members 160, 143 will be moved down through their connections with the cams P, R by means of the sliding bars 156 and 144, until the lower beveled edge portions with which said guide members are preferably provided, are in close proximity to or in actual contact with the upper surface of the stock. The cams P, R are similarly formed and similarly arranged with respect to their connecting parts so that the guide members 160, 143 will always be actuated together.

From the position shown in Fig. 17 the parts move into the position shown in Fig. 18 as the main cam shaft continues to rotate. The cam Q is provided with a dwell which becomes effective at this time to hold the gripping members U, V tightly on the sheet, and both gripping devices G, H which are now tightly clamped on the stock move toward the members U, V from opposite sides. The advancing movements of the devices, G, H toward the fixed gripping device constituted by the members U, V will obviously cause those portions of the metal between the sides of the members U, V and the ends of the respective pairs of gripping jaws to be bent, and the guide members 160, 143 are intended to insure the formation of the bend in the spaces between the lower gripping member V and the lower jaws 37, 69, rather than in the spaces between the upper gripping member and the upper jaws 42, 67. To this end the guide members 160, 143 are lowered from the position shown in Fig. 17 to that shown in Fig. 18 as the pairs of jaws are moved toward the intermediate gripping device, and hence as the pairs of jaws are moved into the position shown in Fig. 18, the upper jaws will almost contact with the members 160, 143. When the position shown in Fig. 18 has been reached, dwells of the cams L, O hold the respective gripping devices G, H stationary, or nearly so, for a small fraction of time while the cams P, R raise the guide members 160, 143, which have now finished their work.

As soon as the guide members clear the upper jaws 42, 67 the cams L, O recommence the movement of the devices G, H toward the intermediate gripping device, and this operation is continued until the walls of the partly formed plait are squeezed up together to the desired extent between the lower jaws 37, 69 and the respective side faces of the block 122 carried by the lower intermediate gripping member V. This lower intermediate gripping member therefore serves as an anvil against the opposite side faces of which two similar plaits are formed by the respective movable gripping members. One wall of one plait will lie flat against one face of the block 122 while the other wall will be more or less tightly jammed against it by means of the gripping member or insert 45ª of the jaw 37. One wall of the other plait will lie against the opposite face of the block 122 while the other wall will be more or less closely jammed against it by the hardened gripping member or insert 74 of the jaw 69. As the members 45ª, 122 and 74 may be accurately fashioned of suitable wear resisting metal, the accuracy of the work may be maintained indefinitely after the machine has once been adjusted.

As the device G reaches its final plaiting position, it is locked in that position by the movement of the sockets of the pins 58 into register with the spring pressed pins 101 in the guide block or bed $E^x$, whereby the pins 101 are enabled to move the pins 58 upwardly and enter the sockets of the latter. At this time the screws 56 are sufficiently far removed from the heads of the pins 58 to enable the pins 101 to socket themselves in the lower jaw 37 to about the extent indicated in Fig. 20. The gripping device H will be similarly locked in the final plaiting position by means of the pins 94 in the block $F^x$ which will press upward the pins 89 and enter the sockets thereof to a certain extent, as indicated.

As the respective pairs of gripping jaws move from the position shown in Fig. 19 to that shown in Fig. 20 the pins 167 and 168 become effective to line up said pairs of jaws accurately with respect to the intermediate gripping device, as hereinbefore described, in order that in the repeated operations of the machine the plaits may be bent up or folded in a uniform manner.

After the two plaits have been formed in the manner described, the cam L will swing the crank shaft 48 to the left sufficiently to release the pins 101 from the sockets of the pins 58 and upon continued movement of the cam the link 46 will be moved to the left to retract the gripping device G from the gripping device U, V. When the crank shaft is swung toward the left on its pivot the screws 54 will be raised to release the upper jaw 42 and the latter will therefore be moved away from the sheet of stock by means of the springs 62 acting on the plates 60. Hence the jaws 37, 42 will be released from the stock, and as the movement of the cam L is continued the jaws 37, 42 will be moved toward the left in their guideway, sliding freely over the stock without pulling it backward. The jaws 37, 42 move backward while the jaws 67, 69 and gripping members U, V are held stationary by their cams in order effectively to prevent the stock from sliding back with the jaws 37, 42. Finally the jaws 37, 42 reach the position shown in Fig. 21 in which the pins 101 enter the sockets of the pins 59 in order to arrest the aforesaid jaws in their retreating movement, the pins 59 being permitted to rise in their sockets by the position which the screws 57 have by this time assumed as a result of the backward swinging of the crank shaft 48. In case the movable gripping device G should tend to overrun in its retreating movement, it will be arrested by means of the stop screw 66 as previously described. The jaws 37, 42 remain free of the metal strip until the cam L reverses the movement of the lever I and pushes the screws 54 downward to clamp the jaws on a new portion of the stock. As this new portion of the stock is gripped between said jaws the screws 57 are depressed to push the pins 101 out of their locking position, and during this movement, which is preparatory to a return movement of the jaws 37, 42, the cams O, Q will so actuate the lever M and sliding bar 111 respectively that the jaws 67, 69 and the gripping members U, V will be released from the stock at substantially the same time by the reversal of the movements previously described. The gripping member U will be elevated from the stock to a considerable distance as shown in Fig. 22 and the upper jaw 67 will be raised to its uppermost position by means of the springs 62 acting on the plates 60; the lower gripping member V, on the other hand, will be lowered by the cams 135 to a distance sufficient to clear the two plaits which have been formed in the sheet at opposite sides of the member V. The latter in descending will carry down with it the lower jaw 69, owing to the engagement of the pins 167 in the holes 167$^a$, and hence the lower jaw will also clear the plaits. This position of the parts is shown in Fig. 22, and it will be noted that as the members V and jaw 69 descend the fixed stripper 172 will be called into play to sustain the sheet of stock in an approximately horizontal position and prevent it from sticking to the member V or member 69, as might be the case if no stripper were provided.

The gripping device G now advances to repeat the cycle of operations hereinbefore described, carrying with it the sheet of metal which is thereby fed forward to carry a fresh portion into position for plaiting. The member V and lower jaw 69 are depressed sufficiently to clear the two plaits which have been formed by the above described operation, and as the sheet of metal is advanced these plaits move freely over the top surface of the block 122 and over the top surface of the block 74, without obstruction, until that plait which is farthest toward the left finally reaches a position in which it lies immediately at the right of the clamping surface of the members 74 and 75 in the clearance space between the jaws 67 and 69. In the meantime the link 81 begins its retreating movement so as to depress the locking pins 94 of the guideway F and thereby release the gripping device H. Immediately on the release of the device H the spring pressed pins 96 (Fig. 28) come into play to assist the link 81 in pulling the device H quickly toward the right, the springs 103 of the pins 96 having been put under compression by the plaiting movement of the device H. At this time both of the movable gripping devices are moving toward the right, but the device G is arranged to move faster than the device H, and as the latter only moves through a comparatively short distance, the two plaits which have been formed will be pushed between the members 74, 75 and into position at the right of said members at approximately the instant that the movement of the device H toward the right is arrested. When the device H reaches the limit of its retreating movement it is locked in its guideway by means of the pins 92, as previously described. It will be understood that when the two initial plaits reach the position indicated, between the jaws of the right hand gripping device, the movement of the left hand gripping device is arrested while the metal is clamped by the right hand jaws and the gripping members U, V, as previously explained. A continuation of the operation will result in the formation of two new plaits which are in turn pushed forward through the gripping device H as the sheet is advanced another step for the commencement of still another operation. The plaited portion of the strip passes out of the machine between the pivoted ends of the jaws 67, 69.

It will be understood that the operation of the machine is continuous and that the flat metal inserted between the jaws at one side of the machine issues from the jaws at the other side of the machine in its finally plaited form. The left hand gripping device gives the sheet an intermittant feeding movement and in the intervals of rest it forms a plait in the sheet simultaneously with the formation of another plait by means of the right hand gripping device, both coöperating with the anvil and its coöperating clamping device in the manner stated. The machine has been found capable of operation at a high speed in actual practice, and of course, in such operation the periods of rest of the several parts as herein described are so short as to be practically indistinguishable. The cams and other operating parts are so timed and constructed that the members of the plaiting mechanism operate together, i. e., at the same time, as far as is possible without interference, and the construction is such that the operations of forming two similar plaits and of feeding the material for the formation of new plaits consume a minimum amount of time and follow each other in rapid succession. When the machine has once been adjusted by the operator and the sheet of stock has been inserted therein, the machine will operate continuously without special attention on the part of the operator, irrespective of the length of the sheet which is to be plaited.

We have not considered it necessary to illustrate the various cams diagrammatically, for it is apparent that proper cams to produce the described movements may be designed by a skilled mechanic. The general illustration of the cams in Fig. 2 will in any event give sufficient information as to the general lines on which they may be constructed, although many variations in this and other minor respects may be adopted within the scope of our invention.

The arrangement of the locking pins to lock the respective movable gripping devices positively in their guideways has been found of advantage in certain cases, but it is not an essential feature in most aspects of the invention for usually the adjustable spring pressed gib 39 or devices serving the same general function will be sufficient for the intended purpose. In case the locking pins of the respective guideways are omitted the sliding pins of the respective movable gripping devices may be arranged to abut the bed portions of the guideways. When the movable gripping devices are frictionally locked in their guideways by adjustable means such as those described, said gripping devices will not slide in their guideways to begin their advancing movements, until the upper jaws have been compressed on the sheet to a predetermined extent to hold the latter tightly in place. On the other hand, the movable gripping devices will not begin their sliding retreating movements until the upper jaws have been fully released from the stock. Of course, the amount of lost motion between each crank shaft and the corresponding upper jaw must be sufficient to allow for a complete releasing of the stock after the formation of each pair of plaits.

In manufacturing the type of automobile radiator sections for which the machine is particularly designed, the sheet of stock is offset or bent along its side edges in the intervals between the plaits, and as previously intimated, this result is effected by proper shaping of the blocks 45, 45ª of the left hand movable gripping device, the blocks 121 and 122 of the fixed intermediate gripping device and the blocks 74, 75 of the right hand movable gripping device. By being brought together on the sheet the respective devices will bend the edge portions of the latter into the desired form at opposite sides of each plait.

In order to provide the sheet with a continuous series of equally spaced identical plaits, the movable gripping devices must obviously be located equidistant from the opposing side faces of the anvil member V when the plaiting operation commences.

In case it is found that the two plaits formed at a single operation are not identical in dimensions, subsequent pairs of plaits formed at successive operations may be readily made identical by adjusting one or the other pair of jaws relatively to its operating mechanism by one or more of the different adjusting means hereinbefore described. In some cases it will be sufficient to adjust one of the eccentric bolts 52 or 82, or to tighten or loosen the spring pressed gib 39 acting on one pair of jaws, or to tighten or loosen the screws 54 which determine the clamping effect of the respective movable gripping devices on the stock. In most cases, however, the timing of the two movable devices G, H will be varied by adjustment of the screws 56 or 87 respectively, which vary the amount of lost motion between the shafts 48 and 78 and the jaws 42 and 67 respectively. As the screws 56 or 87 are screwed through their blocks against the pins 58 or 89 respectively the amount of lost motion will be decreased so that the corresponding pair of jaws will more nearly partake of the complete movement of the corresponding link, whereas if the screws 56 or 87 are adjusted in the opposite direction the amount of lost motion will be increased. As the lost motion is increased the bodily movement of the jaws will be decreased and retarded, whereas when the lost motion is decreased the bodily movement will be increased and hastened. Hence the timing of the movements of the two movable gripping devices may be altered as desired. Moreover, in case the locking pins in the guideways are omitted the adjustment of the screws 56 will vary the travel of the device G in its guideway, so as to increase or decrease the amount of stock which is fed forward after each plaiting operation. If the screws 56 are screwed down nearly to the limit of their downward movement the device G will be carried farther back in its retreating movement than would be the case if more lost motion were provided, as will be understood, and the amount of stock in the plait it forms will be greater. The same adjustment may be effected in the case of the gripping device H. The crank shafts 48 and 78 respectively constitute in connection with the screws carried thereby pivoted clamps for the respective upper jaws of the movable devices by means of which said devices are advanced bodily only after the stock has been tightly clamped therein and by means of which the movable gripping devices are retracted bodily only after the stock has been released. By the adjustments described the time of closing the fixed gripping device and the right hand movable gripping device H on the stock may be varied relatively to the advancing movement of the device G.

Of course, the adjustments described permit the machine to form plaits, the side walls of which are more or less tightly closed together, as may be desired. We have used the term "plait" in a broad sense as indicating a fold, the side walls of which need not be closed together.

In its broader aspects the invention is not necessarily limited to the plaiting of metal nor the plaiting of stock in the form of sheets, for certain general principles involved may be utilized, for example, in the crimping of wire. The foregoing description is necessarily a detailed one in so far as it concerns the particular machine selected for illustration and description, but it will be apparent that numerous features and details herein described may be varied or omitted without digressing from our broad inventive concept as expressed in the claims.

What we claim is:

1. In a plaiting machine, the combination of means to give an intermittent feed to a long sheet or web, means to grip a portion of the sheet, means to grip the sheet at opposite sides of said first gripping means, and to move the portions so gripped toward said first gripping means to bend two plaits, and means to actuate said gripping and bending means to form two plaits in the sheet during an interval of rest, and to then form two additional plaits in the sheet at other points after the sheet has been advanced by the feeding means; substantially as described.

2. In a plaiting machine, the combination with means for giving an intermittent feeding movement to a long sheet or web, of means acting on the upper and lower surfaces of the sheet to grip a portion of the same, means to grip portions of the sheet at opposite sides of said first gripping means and to bend the sheet by moving said portions toward said gripping means, and means to actuate said bending means to form two plaits in the sheet during one interval of rest, and to form two additional plaits in the sheet at other points during the next interval of rest; substantially as described.

3. In a plaiting machine, the combination with means to give an intermittent feeding movement in a horizontal direction to a long sheet or web, of means to grip the stock, means to actuate said feeding means to bend a portion of the sheet at one side of said gripping means, by moving said portion toward said gripping means, and means at the opposite side of said gripping means to grip another portion of the sheet and bend it by a movement in the opposite direction toward said gripping means; substantially as described.

4. In a plaiting machine, three pairs of gripping members arranged in a row to grip the stock at three different points, and means to move the two end pairs of members toward the intermediate pair of members, one of said end pairs of members having a longer travel than the other to feed the stock into position for plaiting; substantially as described.

5. In a plaiting machine, three pairs of gripping members arranged in a row to grip the stock at three different points, the two end pairs of members being movable toward and away from the intermediate pair of members, one of said end pairs of members having a movement to feed the stock forward, and means to move the two end pairs of members toward the intermediate pair of members, to form plaits at two different points, and to move said end pairs of members again toward the intermediate pair after the feeding movement has been completed, to form plaits in the stock at two other points; substantially as described.

6. In a plaiting machine, an anvil, a clamp to clamp the stock on the top of the anvil, a pair of laterally movable hinged jaws at each side of the anvil, said jaws being constructed to permit a continuous sheet or web to pass between them over the anvil, means to actuate one pair of jaws to feed the sheet lengthwise, and then bend a portion thereof against one side of the anvil, and means to actuate the other pair of jaws to bend another portion of the sheet against the opposite side of the anvil; substantially as described.

7. In a plaiting machine, the combination of an intermediate gripper, two end grippers at opposite sides of the intermediate gripper, movable toward the latter to bend the stock, means to move said end grippers bodily, and means to close said end grippers on the stock at different times to produce an intermittent feed of the stock through the intermediate gripper; substantially as described.

8. In a plaiting machine, the combination of an intermediate gripper, and movable grippers at opposite sides of said intermediate gripper adapted to bend the sheet, one of said movable grippers having a feeding movement to feed the stock to said intermediate gripper and to the other movable gripper; substantially as described.

9. In a plaiting machine, the combination of an intermediate fixed gripper, means to close the same on the sheet, movable end grippers at opposite sides of said fixed gripper adapted to bend the sheet, means to reciprocate said end grippers, and means to close them on the sheet, said closing means acting on one of the end grippers to close the same on the stock prior to the other and thereby produce a feeding movement; substantially as described.

10. In a plaiting machine, the combination of an anvil, means to clamp the stock on top of the anvil, and bending devices movable toward and away from the anvil on opposite sides, one of said bending devices constituting a feeding means for the other; substantially as described.

11. In a plaiting machine, the combination of a fixed gripping device, movable gripping devices at opposite sides of the same, means to move one of said movable gripping devices toward said fixed device to bend the stock, and means to move the other gripping device toward the fixed device to feed the stock to the latter; substantially as described.

12. In a plaiting machine, the combination of an anvil having active portions at opposite sides, and benders coöperating with the respective active surfaces of the anvil, one of said benders acting as a feeder for the other; substantially as described.

13. In a plaiting machine, the combination of an anvil, means to clamp on top of the same a portion of a long sheet or web, said anvil having abutment surfaces at opposite sides, and oppositely moving benders coöperating with the respective abutment surfaces, one of said benders being adapted to move the sheet or web forward over the anvil after a bending operation; substantially as described.

14. In a plaiting machine, the combination of an anvil, intermittently acting means to clamp on top of said anvil a portion of a long sheet or web, said anvil having bending surfaces at opposite sides, and movable benders to coöperate with the respective bending surfaces of the anvil, each of said benders being composed of hinged jaws, and one of said benders having a longer advance movement than the other toward the anvil to feed the sheet into position; substantially as described.

15. In a plaiting machine, two bending devices, means to reciprocate them toward and away from each other, and an intermediate gripping device, one of said first named devices constituting a feeding means to feed the stock through said intermediate device and through the other bending device; substantially as described.

16. In a plaiting machine, the combination of an anvil, means to clamp the stock on top of the anvil, and reciprocating bending devices on opposite sides of the anvil, one of which constitutes a feeding means for the other; substantially as described.

17. In a metal plaiting machine, an anvil, means to clamp the stock on the same, reciprocating gripping devices at opposite sides of the anvil for bending the stock against the latter, one of said devices constituting means to feed the stock over the anvil and through the other reciprocating device, means to operate said clamping means, and means to operate said gripping devices; substantially as described.

18. In a plaiting machine, an anvil, automatically operated clamping means to hold the stock on said anvil, reciprocating gripping devices movable toward and away from the anvil at opposite sides of the same, one of said devices constituting a feeding means for the other, means to push the stock into the spaces between the sides of the anvil and the opposing portions of the respective gripping devices, and means to strip the stock from the anvil when the folding operation is completed; substantially as described.

19. In a metal plaiting machine, a reciprocatory anvil, a reciprocating clamping member coöperating therewith, a gripping device movable toward and away from the side of the anvil, and a fixed stripper arranged at the side of the anvil; substantially as described.

20. In a metal plaiting machine, a vertically movable anvil, a fixed stripper alongside the same, automatic means to clamp the stock on top of the anvil, and a gripping device movable toward and away from one of the side faces of the anvil; substantially as described.

21. In a machine of the type described, a reciprocating gripping device movable bodily in a lateral direction, a relatively stationary gripping device composed of members movable toward and away from each other in a vertical direction, a stripper alongside one of said members, and a stock guiding device alongside the other member; substantially as described.

22. In a machine of the type described, the combination of an anvil, a vertically movable clamping member coöperating therewith, horizontally reciprocating gripping devices at opposite sides of said anvil, one of said gripping devices constituting a feeding means to advance the stock between said anvil and said clamping member and into the bite of the other gripping device, and means to push the stock into the spaces between the opposite sides of the anvil and the opposing portions of the respective gripping devices; substantially as described.

23. In a plaiting machine, the combination of a fixed gripper, movable benders at opposite sides thereof, and means to actuate one of said benders to feed the stock to the other bender; substantially as described.

24. In a plaiting machine, the combination of a fixed gripping device, reciprocating benders at opposite sides of the same, and means to actuate one of said benders to grip a sheet or web and feed it through said gripping device to the other bender; substantially as described.

25. In a plaiting machine, the combination of means to grip the stock, and gripping devices to grip portions of the stock at opposite sides of said gripping means, and to bend the stock in conjunction with said gripping means, one of said gripping devices constituting a feeding means for the other; substantially as described.

26. In a plaiting machine, the combination of means to grip the stock, and stock bending devices at opposite sides of said gripping means, of one of said bending devices being constructed and arranged to grip the stock and to feed it to the other bending device; substantially as described.

27. In a plaiting machine, the combination of an intermediate stock gripping device, and gripping devices at opposite sides of said first device and movable toward and away from the latter, both of said movable devices comprising gripping jaws to clamp the stock between them, and one of said devices being constructed and arranged to feed the stock to the other; substantially as described.

28. In a plaiting machine, the combination of a vertically movable anvil, means to clamp the stock on the same, a fixed stripper alongside the anvil, and movable gripping devices at opposite sides of the anvil; substantially as described.

29. In a plaiting machine, the combination of a horizontally fixed intermediate gripping device, horizontally movable gripping devices at opposite sides of said intermediate device, and a stripper interposed between said fixed device and one of said movable devices; substantially as described.

30. In a plaiting machine, the combination of an anvil, means to clamp the stock on the same, means to grip the stock at opposite faces and fold it against a side face of said anvil and to advance the stock when the folding operation has been completed, and means to depress the anvil to get it out of the way of the plait; substantially as described.

31. In a plaiting machine, the combination of an anvil, means to clamp the stock on top of the same, means to grip the stock at opposite surfaces and fold it against a side face of said anvil to form a plait, and to advance the stock after the plait has been formed, means to depress the anvil to clear the plait, and a fixed stripper to strip the stock from the anvil as the latter descends; substantially as described.

32. In a plaiting machine, the combination of an anvil, means to clamp the stock on top of the same, means to grip the stock at opposite surfaces and fold it against a side face of said anvil to form a plait, and to advance the stock after the plait has been formed, means to depress the anvil to clear the plait, and a fixed stripper to strip the stock from the anvil as the latter descends, said stripper comprising a plate extending alongside of the anvil between the latter and said gripping means; substantially as described.

33. In a plaiting machine, a vertically moving anvil, means to hold the stock on the upper face of the same, means to fold the stock against a side face of said anvil while held by said first means, and a fixed stripper located alongside of the anvil; substantially as described.

34. In a plaiting machine, the combination of an anvil, means to clamp the stock on the same, a stock folding device at one side of the anvil comprising movable jaws, means at the other side of the anvil to feed the stock to the latter and to said jaws, means to actuate said jaws to bend the stock against the anvil and form a plait, and means to shift one of said jaws to clear the plait and permit a new feeding movement of the stock; substantially as described.

35. In a plaiting machine, the combination of a depressible anvil, means to clamp the stock on the same, a stock folding device at one side of the anvil having a depressible jaw, and a feeding device at the opposite side of the anvil; substantially as described.

36. In a plaiting machine, the combination of an anvil, means to clamp the stock on the same, laterally movable stock gripping devices at opposite sides of said anvil arranged to fold the stock against opposite sides of the anvil, one of said devices constituting means to feed the stock over the anvil and through the other gripping device, and means to shift the anvil and a portion of such other device to clear the plaits formed in the stock and permit a new feeding movement; substantially as described.

37. In a plaiting machine, the combination of three gripping devices, two of which are movable relative to the third to form two plaits in the stock, means to close one of said movable devices on the stock and advance it relatively to the other devices to feed the stock into position, and means to close the other devices on the same when the feeding movement has been completed; substantially as described.

38. In a plaiting machine, the combination of an intermediate gripping device, a movable gripping device at one side of the same having a stock feeding movement and a plaiting movement, and a gripping device at the opposite side of said first device having a plaiting movement and a movement to clear the plaited stock; substantially as described.

39. The combination with a sliding gripping device, of an oscillating actuating member therefor, which closes said device on the stock and then shifts said device bodily, and a variable lost motion connection between said operating means and said movable device whereby the bodily movement of the latter may be varied; substantially as described.

40. In a plaiting machine, the combination of an anvil, means to clamp the stock on the same, a gripping device adapted to grip the stock and fold it against a side face of the anvil, means for reciprocating said gripping device, and a variable lost motion connection between said gripping device, and the means for reciprocating the same, whereby the amount of stock formed in the plait may be varied; substantially as described.

41. In a plaiting machine, the combination of an anvil, means to clamp the stock on the same, a guide, a gripping and bending device movable in said guide toward and away from the anvil, and comprising relatively movable upper and lower elements, a pivoted clamp carried by the lower element and adapted to clamp the upper element on the stock, and means connected with said pivoted clamp to shift said gripping device bodily; substantially as described.

42. In a plaiting machine, the combination of an anvil, means to clamp the stock on the same, a guide, a gripping and bending device movable in said guide toward and away from the anvil, and comprising relatively movable upper and lower elements, a pivoted clamp carried by the lower element and adapted to clamp the upper element on the stock, means connected with said pivoted clamp to shift said gripping device bodily, and a variable lost motion connection between said clamp and the gripping element actuated thereby, whereby the amount of stock formed in the plait may be varied; substantially as described.

43. In a machine of the type described, a gripping device, a guide in which said device is slidable, a clamp to close said device on the stock, and means controlled by said clamp to lock said device in said guide and release it therefrom; substantially as described.

44. In a machine of the type described, a movable gripping device, a clamp to close said device on the stock, operating means for shifting said device bodily, connected with said clamp to clamp the same on the stock, and means controlled by the clamp to lock said gripping device in a fixed position and release the same; substantially as described.

45. In a machine of the type described, a gripping device, a guide in which said device is slidable, a clamp to close said device on the stock, operating means for shifting said device bodily, connected with said clamp, and means controlled by the movement of said clamp, to lock said gripping device in said guide and release it therefrom; substantially as described.

46. In a machine for plaiting metal sheets, a vertically movable anvil, a clamping member coöperating therewith, a laterally movable gripping device to coöperate with said anvil, having a relatively movable jaw, and means to depress said anvil and said jaw to permit the feeding of a plaited sheet between them and their coöperating members; substantially as described.

47. The combination of a fixed gripping device, means at one side of said gripping device to form a plait in the stock and to feed the stock through said gripping device, a movable gripping device at the opposite side of said gripping device composed of upper and lower jaws, and means to depress the lower jaw of said gripping device to permit the feeding of the plaited stock between the same and the upper jaw; substantially as described.

48. The combination of a vertically movable anvil, a clamping member coöperating therewith, a feeding device at one side of the anvil to feed the stock over the latter, a gripping device at the other side of the anvil having a movable jaw, and means to raise and depress said jaw and said anvil; substantially as described.

49. The combination of a fixed gripping device, a movable gripping and bending device which closes on the stock and advances it toward said fixed gripping device, means for closing said fixed gripping device on the stock as the movable device is advanced toward the same, and means for hastening or retarding the gripping action of said fixed device relatively to the movement of said movable device; substantially as described.

50. The combination of a fixed gripping device, a movable gripping device at one side of the same which closes on the stock and advances it through said fixed device, means for closing said fixed device on the stock at a predetermined point in the travel of said movable device, and means at the side of said fixed device opposite said movable device to grip the stock after said first movable gripping device has advanced it to a certain extent, and to carry a portion of the stock backward toward said fixed device; substantially as described.

51. The combination of a fixed gripping device, a movable gripping device at one side of the same which closes on the stock and advances it through said fixed device, means for closing said fixed device on the stock at a predetermined point in the travel of said movable device, and a laterally reciprocating gripping device at the opposite side of said fixed gripping device which pushes a portion of the stock toward and into contact with said fixed device after the latter has been clamped on another portion of the stock; substantially as described.

52. The combination of an automatically operated fixed gripping device, a movable gripping device at one side of the same which closes on the stock and feeds it through said fixed device prior to the closing of the latter, and then continues to advance toward said fixed device to form a plait in the stock, and a second movable device at the opposite side of said fixed device which grips the stock and advances it toward said fixed device after the latter has been closed on the stock, whereby a second plait is formed; substantially as described.

53. The combination of a fixed gripping device, a movable gripping device at one side of the same which closes on the stock and advances it through said fixed gripping device, a movable gripping device at the other side of said fixed device which closes on the stock after the same has been fed forward to a certain extent by said first movable device and advances toward said fixed device from its respective side, and means to close said fixed device on the stock substantially simultaneously with the closing of said second movable device on the same; substantially as described.

54. The combination of three gripping devices, two of which are movable relative to the third to form two plaits in the stock, means to close one of said movable devices on the stock and advance it relatively to the other devices to feed the stock into position, and means to close the other devices on the stock when the feeding movement has been completed; substantially as described.

55. The combination of three gripping devices two of which are movable relatively to the third, means to close one of said movable devices on the stock and advance it relatively to the other devices, and means to close the other devices on the stock when the feeding movement has been completed and to then move the second movable device toward the third device substantially simultaneously with the continued advance movement of said first movable device; substantially as described.

56. The combination of a fixed gripping device, a movable gripping device at one side of the same, a second movable gripping device at the other side of said fixed device, and means for closing said second gripping device on the stock and moving it to feed the stock forward into the other two devices, closing such other devices on the stock when the latter has been fed forward to a certain extent, and for moving said first movable gripping device toward said fixed device as the advance movement of said second movable device is continued; substantially as described.

57. The combination of three gripping devices, two of which are movable relative to the third, means to close one of said movable devices on the stock and advance it relatively to the other devices, and means to close the other devices on the stock when the feeding movement has been completed, and to then move both of the movable devices toward the third device to form plaits at different points; substantially as described.

58. In a machine of the type described, the combination of a vertically movable anvil, a vertically movable clamping element above the same, a laterally reciprocating gripping device at one side of said anvil, means to actuate said device, means to actuate said clamping element, and a connection between said last named means and said anvil whereby the latter is raised and lowered; substantially as described.

59. In a machine of the type described, a vertically movable anvil, a vertically movable clamping member above the same, a gripping device at one side of said anvil composed of separate jaws, means to close said jaws on the stock and move them bodily toward said anvil, a second gripping device at the opposite side of the anvil, means to actuate said last named gripping device to grip and advance the stock, and means to lower the anvil and the lower jaw of said first gripping device to permit the plaited sheet to be fed forward for another operation; substantially as described.

60. The combination of a fixed gripper, movable benders, means to close one of said benders on the stock and feed it toward the gripper and the other bender, and means to close the gripper and said other bender on the stock when the stock has been fed forward to a certain extent and to then move both benders toward the gripper to form two plaits in the stock; substantially as described.

61. The combination of an anvil, two benders adapted to grip the stock and move it toward opposite sides of said anvil, means to close one of said benders on the stock, and advance it relatively to the anvil and the other bender so as to feed the stock into position, and means to close the other bender and to clamp the stock on the anvil when the stock has been fed forward to a certain extent and to then move the second bender toward the opposite side of the anvil substantially simultaneously with the continued advance movement of the first bender; substantially as described.

62. In a plaiting machine, the combination of an intermediate fixed gripper, movable end grippers at opposite sides of said fixed gripper adapted to bend the stock, means to close said fixed gripper on the stock, means to close the end grippers on the stock, and to move them toward and away from said fixed gripper, and means for actuating the means for moving and closing the end grippers and the means for closing the intermediate gripper in such a manner as to form two plaits in the stock, and then feed the latter forward; substantially as described.

63. In a plaiting machine, the combination of means to grip a portion of a long sheet or web, and advance such sheet or web in one direction, a second means in advance of the first to grip another portion of the sheet during such movement of the latter, so that one portion of the sheet is arrested, and another portion is formed into a plait by the continued movement of said first means, and means in advance of said second means to form another plait in the stock; substantially as described.

64. In a plaiting machine, the combination of means to grip a portion of a long sheet or web and advance such sheet or web in one direction, a second means in advance of the first to grip another portion of the sheet during such movement of the latter, so that one portion of the sheet is arrested, and another portion is formed into a plait by the continued movement of said first means, and means in advance of said second means to form another plait in the stock, while the stock is held by said gripping and arresting means; substantially as described.

65. In a plaiting machine, the combination of means to grip a portion of a long sheet or web and advance such sheet or web in one direction, a second means in advance of the first to grip another portion of the sheet during such movement of the latter, so that one portion of the sheet is arrested, and another portion is formed into a plait by the continued movement of said first means, and means in advance of said second means to form another plait in the stock simultaneously with the formation of the first named plait; substantially as described.

66. In a plaiting machine, the combination of three gripping devices arranged in a row, means to actuate one of the end gripping devices to advance the sheet, means to close the intermediate gripping device on the sheet during the advance movement thereof so as to form a plait in the sheet at one side of said intermediate device, and means to actuate the other end gripping device to form another plait in the sheet at the opposite side of said intermediate gripping device; substantially as described.

67. In a plaiting machine, the combination of a fixed gripper to grip a portion of a sheet or web, means at one side of said gripper to bend the sheet or web into a plait while held by said fixed gripper, and means at the other side of the fixed gripper to bend the sheet into another plait and to feed the sheet forward after the plaits have been formed; substantially as described.

In witness whereof, we have hereunto set our hands on the 13th day of December, 1912.

LOUIS T. BULLEY.
GARDNER E. WHEELER.

Witnesses:
HENRY E. ROCKWELL,
M. OLIVE WILLIAMS.

Correction in Letters Patent No. 1,139,454.

It is hereby certified that Letters Patent No. 1,139,454, granted May 11, 1915, upon the application of Louis T. Bulley and Gardner E. Wheeler, of New Haven, Connecticut, for an improvement in "Plaiting-Machines," were erroneously issued to said Bulley and Wheeler, whereas said Letters Patent should have been issued to *The English & Mersick Company, of New Haven, Connecticut, a corporation of Connecticut*, as shown by the records of assignments in this Office; and that the said Letters Patent should be read with this correction therein that the same may conform to the record of the case in the Patent Office.

Signed and sealed this 1st day of June, A. D., 1915.

[SEAL.]

J. T. NEWTON,
*Acting Commissioner of Patents.*